(12) United States Patent
Bullard et al.

(10) Patent No.: US 8,432,288 B2
(45) Date of Patent: Apr. 30, 2013

(54) SENSORS IN COMMUNICATION DEVICES

(75) Inventors: Gregory T. Bullard, La Mesa, CA (US);
Desiree D. Brake, Poway, CA (US);
Christopher J. Pruetting, Poway, CA (US); Raymond S. Stits, Carlsbad, CA (US); Jason Tory Ryberg, Arlington, WA (US); Jason C. Thomas, Carlsbad, CA (US); Diane M. Winchell, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 12/555,205

(22) Filed: Sep. 8, 2009

(65) Prior Publication Data
US 2010/0315242 A1 Dec. 16, 2010

Related U.S. Application Data

(60) Provisional application No. 61/187,088, filed on Jun. 15, 2009.

(51) Int. Cl.
*G08B 17/00* (2006.01)

(52) U.S. Cl.
USPC .................. 340/584; 340/500; 340/540

(58) Field of Classification Search .................. 340/584
See application file for complete search history.

(56) References Cited

U.S. PATENT DOCUMENTS

| | | | |
|---|---|---|---|
| 6,031,454 A | 2/2000 | Lovejoy et al. | |
| 6,047,234 A | 4/2000 | Cherveny et al. | |
| 6,940,403 B2 * | 9/2005 | Kail, IV | 340/539.12 |
| 7,109,859 B2 | 9/2006 | Peeters | |
| 7,148,303 B2 | 12/2006 | Bandy et al. | |
| 7,152,019 B2 | 12/2006 | Tarantola et al. | |
| 7,492,254 B2 | 2/2009 | Bandy et al. | |
| 7,518,504 B2 | 4/2009 | Peeters | |
| 7,623,028 B2 * | 11/2009 | Kates | 340/521 |
| 2004/0149918 A1 | 8/2004 | Craig et al. | |
| 2005/0128067 A1* | 6/2005 | Zakrewski | 340/511 |
| 2005/0181414 A1 | 8/2005 | Webster et al. | |
| 2006/0026669 A1 | 2/2006 | Zakas | |
| 2006/0079208 A1 | 4/2006 | Kim et al. | |

(Continued)

FOREIGN PATENT DOCUMENTS

| | | |
|---|---|---|
| DE | 10134126 | 1/2003 |
| DE | 102007014650 | 6/2008 |

OTHER PUBLICATIONS

Christian Wartenburger: "Diplomarbeit, Experimentelle Analyse verteilter Ereigniserkennung in Sensornetzen" [Online] Dec. 19, 2008, Diplomarbeit, Freie Uiversitat Berlin, Berlin, p. 1-130 , XP00259149.

(Continued)

*Primary Examiner* — Kerri McNally
(74) *Attorney, Agent, or Firm* — Michelle Gallardo; Nicholas J. Pauley; Jonathan T. Velasco

(57) ABSTRACT

Disclosed are methods and apparatuses for communication. In certain aspects, an apparatus for communication includes one or more sensors configured to measure a condition external to the apparatus, a circuit configured to determine when to transmit data based on the measurement to another apparatus, wherein the determination is based on at least one parameter configurable by the another apparatus, and a transmitter configured to transmit the data.

40 Claims, 15 Drawing Sheets

U.S. PATENT DOCUMENTS

| | | | |
|---|---|---|---|
| 2006/0176169 A1* | 8/2006 | Doolin et al. | 340/521 |
| 2006/0202821 A1 | 9/2006 | Cohen | |
| 2006/0290496 A1 | 12/2006 | Peeters | |
| 2008/0052757 A1 | 2/2008 | Gulati et al. | |
| 2008/0068156 A1 | 3/2008 | Shimokawa et al. | |
| 2008/0224845 A1 | 9/2008 | Bires | |
| 2009/0141898 A1 | 6/2009 | Huang | |
| 2010/0315207 A1 | 12/2010 | Bullard et al. | |
| 2010/0318641 A1 | 12/2010 | Bullard et al. | |

OTHER PUBLICATIONS

Goni A et al: "Real-Time Monitoring of Mobile Biological Sensor Data-Streams: Architecture and Cost-Model" Apr. 27, 2008, MOB1 Le Data Management Workshops, 2008. MDMW 2008. Ninth International Conference on, IEEE, Piscataway, NJ, USA, p. 97-105, XP031449810 ISBN: 978-1-4244-4484-7.

International Search Report and Written Opinion—PCT/US2010/038726, International Search Authority—European Patent Office—Nov. 09, 2010 (081637U1).

Jie Lian et al: "Gradient Boundary Detection for Time Series Snapshot Construction in Sensor Networks" Oct. 1, 2007, IEEE Transactions on Parallel and Distributed Systems, IEEE Service Center, Los Alamitos, CA, US LNKDDOI: 10.1109/TPDS.2007.1057, pp. 1462-1475, XP011191971 ISSN: 1045-9219.

\* cited by examiner

SENSORS IN COMMUNICATION DEVICES

CLAIM OF PRIORITY UNDER 35 U.S.C. §119

The present application for patent claims priority to Provisional Application No. 61/187,088 entitled "SENSOR NETWORK MANAGEMENT" filed Jun. 15, 2009, and assigned to the assignee hereof and hereby expressly incorporated by reference herein.

RELATED APPLICATIONS

The present Application is related to co-pending application entitled "Sensor Network Management" Ser. No. 12/555,322, filed on the same day as the present Application, and co-pending application entitled "Sensor Network Management" Ser. No. 12/555,381, filed on the same day as the present Application.

BACKGROUND

I. Field

The following description relates generally to communication devices, and more particularly to management of sensors in communication devices.

II. Background

Currently in the Unites States and other countries, there is no widely deployed and continuous operational system capable of detecting, assessing and reacting to a terrorist attack with chemical, biological and/or nuclear weapons or accidental release of dangerous toxins throughout a large area.

In one aspect of the disclosure, there is a need for a system capable of detecting, assessing and reacting to a chemical, biological substance and/or radiation using a network of sensors dispersed throughout a large area. In another aspect, there is a need to manage the sensor network to control loading of the sensor network to improve efficiency.

SUMMARY

According to an aspect of the disclosure, an apparatus for communication is disclosed. The apparatus includes one or more sensors configured to measure a condition external to the apparatus, a circuit configured to determine when to transmit data based on the measurement to another apparatus, wherein the determination is based on at least one parameter configurable by the another apparatus, and a transmitter configured to transmit the data.

According to another aspect of the disclosure, a method for communication is disclosed. The method includes measuring a condition external to an apparatus using one or more sensors, determining when to transmit data based on the measurement to another apparatus based on at least one parameter configurable by the another apparatus, and transmitting the data to the another apparatus.

According to yet another aspect of the disclosure, an apparatus for communication is disclosed. The apparatus includes means for measuring a condition external to an apparatus using one or more sensors, means for determining when to transmit data based on the measurement to another apparatus based on at least one parameter configurable by the another apparatus, and means for transmitting the data to the another apparatus.

According to yet another aspect of the disclosure, a machine-readable medium for storing instructions is disclosed. The instructions, upon execution by an apparatus, cause the apparatus to measure a condition external to an apparatus using one or more sensors, determine when to transmit data based on the measurement to another apparatus based on at least one parameter configurable by the another apparatus, and transmit the data to the another apparatus.

According to yet another aspect of the disclosure, an access terminal is disclosed. The access terminal comprises one or more sensors configured to measure a condition external to the apparatus, a circuit configured to determine when to transmit data based on the measurement to another apparatus, wherein the determination is based on at least one parameter configurable by the another apparatus, an antenna, and a transmitter configured to transmit the data via the antenna.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

These and other sample aspects of the disclosure will be described in the detailed description that follows, and in the accompanying drawings, wherein.

Figure 1:
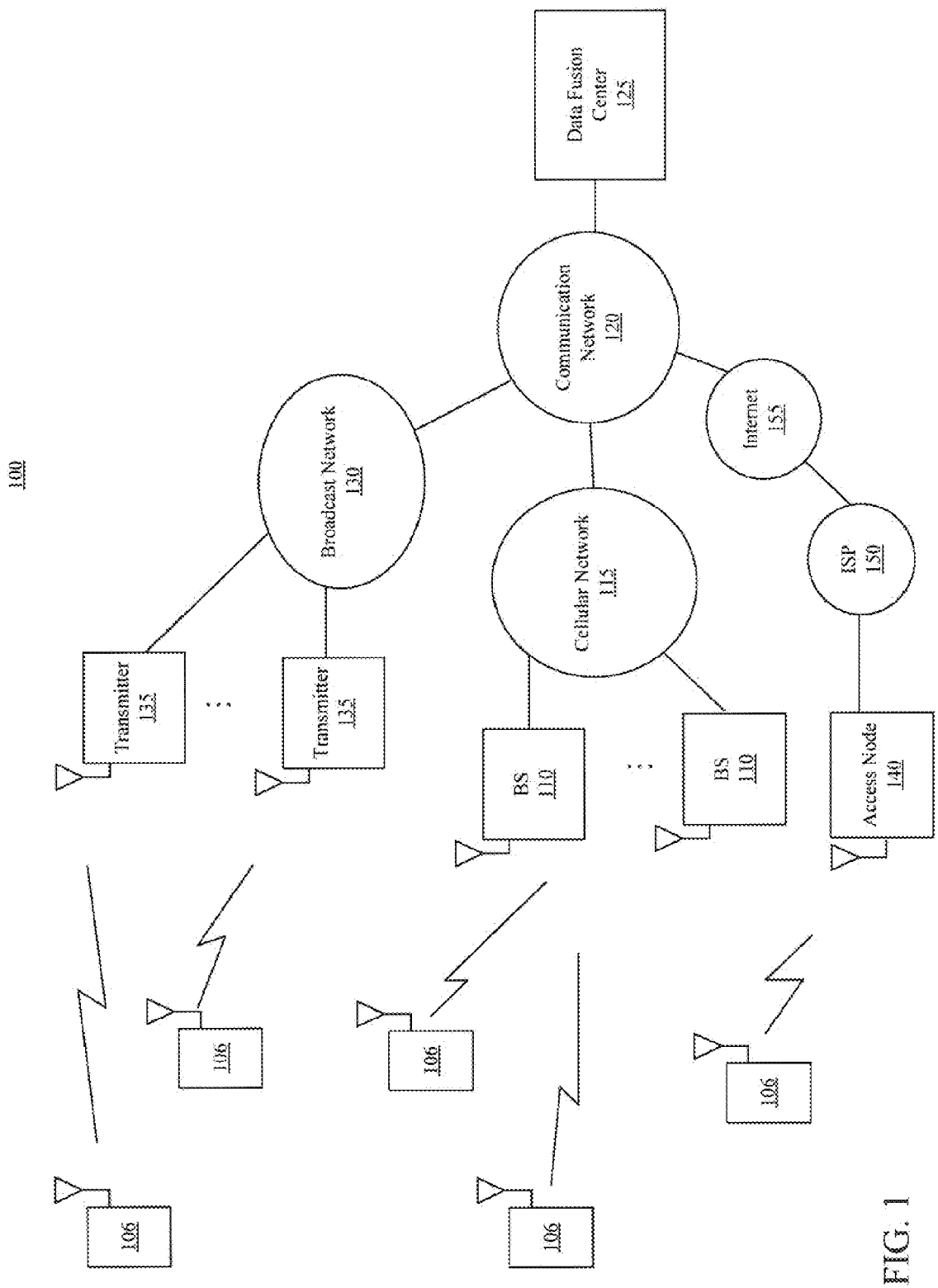
FIG. 1 is a conceptual block diagram illustrating an exemplary communication system.

In accordance with common practice, some of the drawings may be simplified for clarity. Thus, the drawings may not depict all of the components of a given apparatus (e.g.,

DETAILED DESCRIPTION

Various aspects of the disclosure are described more fully hereinafter with reference to the accompanying drawings. They may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of an apparatus or method contained herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosed herein may be embodied by one or more elements of a claim.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

FIG. 1 is a diagram of an exemplary communication system 100 according to certain aspects of the present disclosure. In one aspect, the communication system 100 may comprise a plurality of communication devices 106. A communication device 106 may also be referred to as a user terminal, an access terminal, a mobile station, a subscriber station, a terminal, a node, user equipment (UE), a wireless device, mobile equipment (ME) or some other terminology. A communication device 106 may be fixed or mobile. Examples of communication devices include a cellular phone, a Personal Digital Assistant (PDA), a laptop, a desktop computer, a digital audio player (e.g., MP3 player), a camera, a game console, a data transceiver or any other suitable communication device. A communication device 106 may comprise one or more antennas for communication over a wireless link.

The communication system 100 may also comprise a plurality of base stations 110 and a cellular network 115. Each base station 110 comprises a transceiver and one or more antennas to provide wireless communication with one or more communication devices 106. A base station 110 may also be referred to as an access point. In one aspect, each base station 110 communicates with communication devices 106 in a cell or sector serviced by the base station 110. Each cell may correspond to a geographical area covered by the corresponding base station 110. A geographical area covered by a base station 110 may be referred to as a coverage area of the base station 110.

Different technologies may be used to provide communication between the communication devices 106 and the base stations 110 such as (1) a code division multiple access (CDMA) system that transmits data for different users using different orthogonal code sequences, (2) a frequency division multiple access (FDMA) system that transmits data for different users on different frequency subbands, (3) a time division multiple access (TDMA) system that transmits data for different users in different time slots, (4) a spatial division multiple access (SDMA) system that transmits data for different users on different spatial channels, (5) an orthogonal frequency division multiple access (OFDMA) system that transmits data for different users on different frequency subbands, and so on. An OFDM system may implement IEEE 802.11 or some other air interface standard. A CDMA system may implement IS-2000, IS-95, IS-856, Wideband-CDMA or some other air interface standard. A TDMA system may implement Global System for Mobile Communications (GSM) or some other suitable air interface standard. As those skilled in the art will readily appreciate, the various aspects of the disclosure are not limited to any particular wireless technology and/or air interface standard.

The cellular network 115 may provide communication between the communication devices 106 and other networks (e.g., the Internet, Public Switched Telephone Network (PSTN) or other network) through one or more base stations 110. For example, the cellular network 115 may route data received from another network and intended for a communication device 106 to the base station 110 servicing the communication device 106. In another example, the cellular network 115 may route data received by a base station 110 from a communication device 116 to another network. The cellular network 115 may also route data between communication devices 106 through one or more base stations 110. The cellular network 115 may also perform various functions such as coordinating handoff of a communication device 106 between two or more base stations 110 (e.g., when a user of the communication device moves from one cell to another cell), managing transmit power of the communication devices 106 and base stations 110, converting data between different protocols and/or other functions.

The system 100 may further comprise a communication network 120 and a data fusion center 125. In one aspect, the communication network 100 provides communication between the cellular network 115 and the data fusion center 125. In another aspect, the data fusion center 125 may directly communicate with the cellular network 115. The communication network 120 may comprise any network, for example, a LAN network, a WAN network, the Internet, an intranet, a Public Switched Telephone Network (PSTN), an Integrated Services Digital Network (ISDN), other network or a combination thereof. Data in the communication network 120 may be routed to the data fusion center 125 using an address for the data fusion center 125, such as, but not limited to, an IP address, a Domain name, a phone number or other address.

The system 100 also includes a broadcast network 130 and a plurality of transmitters 135. In one aspect, the broadcast network 130 is able to broadcast data to multiple communication devices 106 over a wide geographical area via one or more transmitters 135. The broadcast data may include audio and video streams, messages, or other data. In one aspect, the transmitters 135 may be distributed geographically so that each transmitter 135 covers communication devices 106 within a particularly geographical area. This allows the broadcast network 130 to target broadcast data to communication devices 110 within a particular geographical area by broadcasting the data from the corresponding transmitter 110. The broadcast network 130 may be implemented using any one of a number of technologies supporting data broadcast including MediaFLO, 1seg, Digital Video Broadcasting-Handheld (DVB-H) or other technology. In one aspect, the broadcast network 130 is in communication with the data fusion center 125 via the communication network 120 or directly.

The cellular network 115 may also be used to broadcast data to multiple communication devices 106. For example, the cellular network 115 may broadcast data from a base station 110 using a common channel that is shared by multiple communication devices 106.

The system 100 may further comprise a wireless access node 140, an Internet Service Provider (ISP) 150 and the Internet 155. In one aspect, the wireless access node 140 communicates with communication devices 106 to provide the communication devices 106 with wireless Internet access. The wireless access node 140 may communicate with a communication device 106 using any one of a number of wireless technologies including Wi-Fi, IEEE 802.11, broadband wireless technology, Bluetooth, Zigbee, Near Field Communication (NFC) or other technology. In one aspect, the wireless access node 140 sends data to and receives data from the Internet 155 through the Internet Service Provider (ISP) 150. The wireless access node 140 may be coupled to the ISP 150 via a DSL line, a cable, optical fiber, or other link. Although shown separately in FIG. 1, the Internet 155 may be included as part of the communication network 120. The data fusion center 125 may be in communication with the Internet 155 via the communication network 120 or directly.

Figure 2:
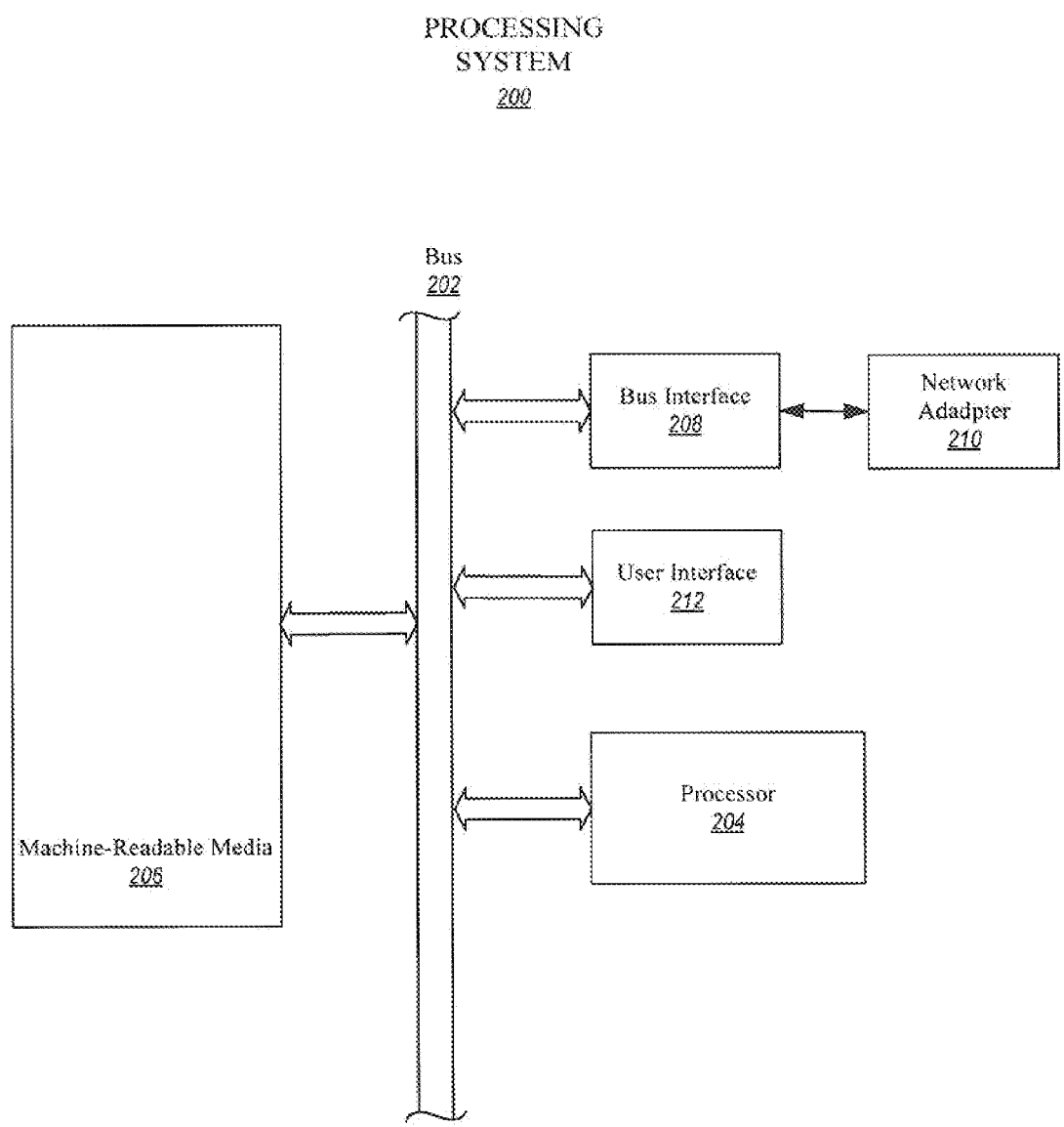
FIG. 2 is a block diagram illustrating exemplary hardware for a processing system.

FIG. 2 is a conceptual diagram illustrating an example of a hardware configuration for a processing system 200 according to certain aspects of the present disclosure. The processing system 200 may be used in a communication device 106, in the data fusion center 125 and in any of one of the networks (e.g., cellular network 115) to perform functions described in this disclosure.

In this example, the processing system 200 may include a bus architecture represented generally by bus 202. The bus 202 may include any number of interconnecting buses and bridges depending on the specific application of the processing system 200 and the overall design constraints. The bus 202 links together various circuits including a processor 204, machine-readable media 206, and a bus interface 208. The bus interface 208 may be used to connect a network adapter 210, among other things, to the processing system 200 via the bus 202. For the example of a communication device 106, the network adapter 210 may support wireless communication using a transmitter and a receiver implementing any one or a combination of the wireless technologies discussed above including CDMA, TDMA, OFDM and/or other wireless technologies. For the example of the data fusion center 125, the network adapter 210 may support network communication for receiving and sending data via the communication network 120 using any network communication protocol.

A user interface 212 (e.g., keypad, display, mouse, joystick, etc.) may also be connected to the bus 202. The bus 202 may also link various other circuits such as timing sources, peripherals, voltage regulators, power management circuits, and the like, which are well known in the art, and therefore, will not be described any further.

The processor 204 is responsible for managing the bus and general processing, including the execution of software stored on the machine-readable media 206. The processor 204 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 2, the machine-readable media 206 is shown as part of the processing system 200 separate from the processor 204. However, as those skilled in the art will readily appreciate, the machine-readable media 206, or any portion thereof, may be external to the processing system 200. By way of example, the machine-readable media 206 may include a transmission line, a carrier wave modulated by data, and/or a computer product separate from the communication device 106 or data fusion center 125, all which may be accessed by the processor 204 through the bus interface 208. Alternatively, or in addition to, the machine readable media 206, or any portion thereof, may be integrated into the processor 204, such as the case may be with cache and/or general register files.

The processing system 200 may be configured as a general-purpose processing system with one or more microprocessors providing the processor functionality and external memory providing at least a portion of the machine-readable media 206, all linked together with other supporting circuitry through an external bus architecture. Alternatively, the processing system 200 may be implemented with an ASIC (Application Specific Integrated Circuit) with the processor 204, the bus interface 208, supporting circuitry (not shown), and at least a portion of the machine-readable media 206 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. For the example of the data fusion center 125, the processor 204 may be implemented using a plurality of processors at different locations in a distributed computing architecture, in which a process is divided among the plurality of processors which communicate with one another, e.g., over a network. Those skilled in the art will recognize how best to implement the described functionality for the processing system 200 depending on the particular application and the overall design constraints imposed on the overall system.

The machine-readable media 206 may comprise a number of software modules stored thereon. The software modules include instructions that when executed by the processor 204 cause the processing system 200 to perform various functions. Each software module may reside in a single storage device or distributed across multiple storage devices. By way of example, a software module may be loaded into RAM from a hard drive when a triggering event occurs. During execution of the software module, the processor 204 may load some of the instructions into cache to increase access speed. One or more cache lines may then be loaded into a general register file for execution by the processor 204. When referring to the functionality of a software module below, it will be understood that such functionality is implemented by the processor 204 when executing instructions from that software module.

Figure 3:
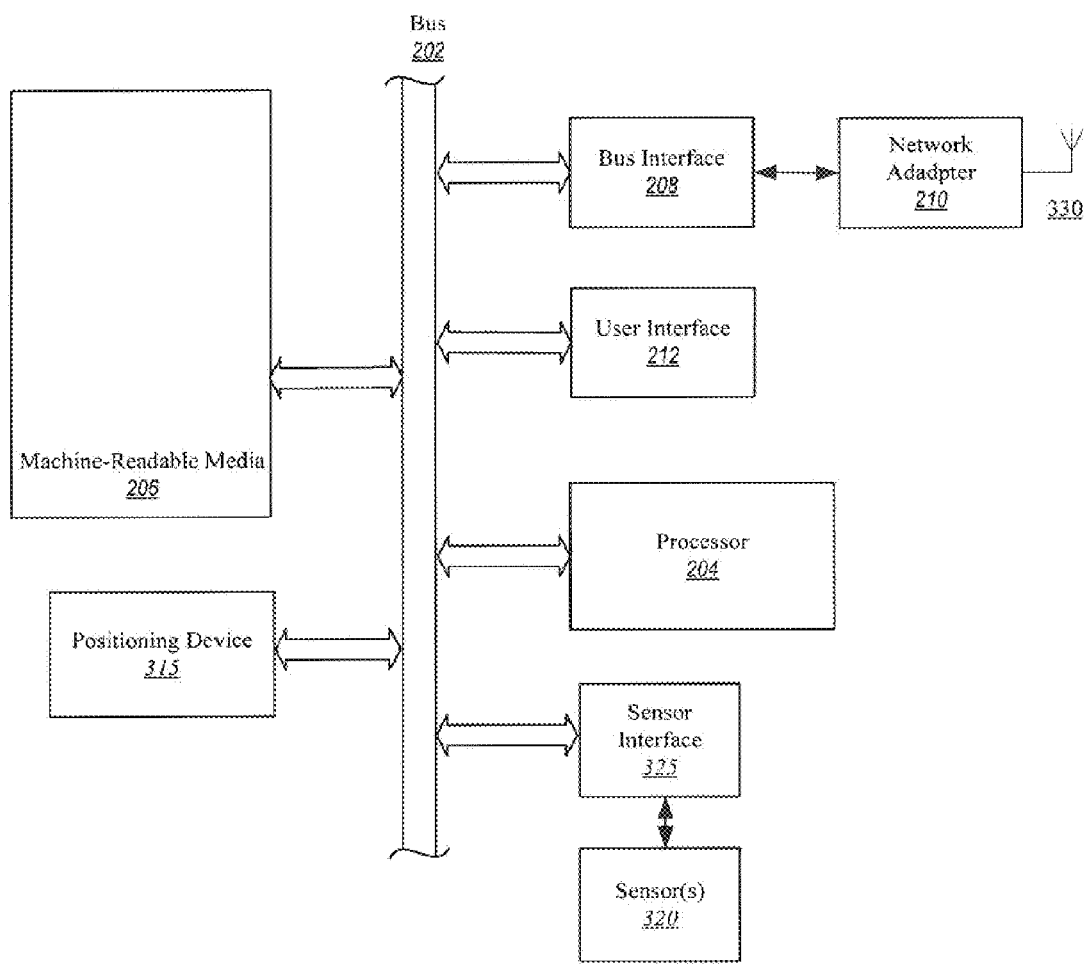
FIG. 3 is a block diagram illustrating exemplary hardware for a communication device.

FIG. 3 is a conceptual diagram illustrating an example of a communication device 106 according to certain aspects of the present disclosure. The communication device 106 includes the exemplary processing system 200 illustrated in FIG. 2. The communication device 106 may also include a positioning device 315, one or more sensors 320, and a sensor interface 325.

The positioning device 315 may be configured to determine a geographical location of the communication device 106. The processor 204 may obtain the location (e.g., coordinates) of the communication device 106 from the positioning device 315 via the bus 202. The positioning device 240 may be implemented with any one of a number of satellite positioning systems (SPS), such as the United States Global Positioning System (GPS), The Russian Glonass system, the European Galileo system, any system that uses satellites from a combination of satellite systems, or any satellite system developed in the future.

The one or more sensors 320 may comprise chemical, biological, radiation, humidity and/or temperature sensors. The sensors 320 may be implemented using various sensor technologies. For example, chemical sensors may comprise a material that absorbs a particular chemical, which produces a change in a property of the material. By way of example, the material may be incorporated into a sensor in which absorption of a desired chemical by the material causes a detectable change in an electrical property (e.g., capacitance, resistance, resonant frequency, etc.) of the sensor. The sensors 320 may include a plurality of sensors comprising different materials (e.g., polymers, ceramics, metals or combination thereof) that are sensitive to different chemicals, biological substances and/or types of radiation for detecting a plurality of different chemicals, biological substances and/or types of radiation. Chemicals, biological substances and radiation may also be detected using a combination of two or more sensors.

A chemical sensor may be configured to detect harmful chemicals such as nerve agents (e.g., Sarin gas), tear gas, toxins, industrial chemicals and other hazardous chemicals. A biological sensor may be configured to detect harmful biological substances such as Anthrax, diseases and other hazardous biological substances. A radiation sensor may be configured to detect harmful radiation such as x-rays, gamma rays, alpha rays, beta rays and other harmful rays (e.g., emitted by radioactive material). In this disclosure, harmful chemicals, biological substances and radiation may be referred to as contaminates.

The sensors 320 may comprise discrete sensors and/or multiple sensors integrated on a substrate. The communication device 106 may have one or more openings (not shown) located near the sensors 320. The openings may be used to allow chemicals, biological substances and/or other airborne contaminates from the external environment to interact with one or more internal sensors 320. In another aspect, one or more of the sensors 320 may be disposed on an external surface of the communication device 106.

The sensor interface 325 interfaces the sensors 320 with the processor 204. For example, the sensor interface 325 may covert analog sensor signals from the sensors 320 into digital sensor data for analysis by the processor 204. The sensor interface 320 may also perform other signal processing on the sensor signals including filtering, and/or amplification. The sensor interface 220 may also receive instructions from the processor 204 for taking readings from one or more sensors 320. When the sensor interface 325 receives an instruction from the processor 204 to take a reading from a sensor 320, the sensor interface 325 may activate the sensor 320, process the resulting sensor signal into sensor data for analysis by the processor 204 and send the sensor data to the processor 204.

The sensor interface 325 may be implemented with an ASIC, one or more FPGAs, PLDs, controllers, state machines, gated logic, discrete hardware components, or any other suitable circuitry, or any combination of circuits. The sensor interface 325 may also include machine-readable media for storing instructions from the processor 204, temporarily storing sensor data, and/or storing software executed by a processor of the sensor interface 325 for implementing functions described herein. The machine-readable media may include RAM, flash memory, ROM, PROM, EEPROM, registers, or any other suitable storage media.

The processor 204 and sensor interface 325 may communicate via the bus 202 and/or other structures or devices. For example, the processor 204 and sensor interface 325 may communicate over a short-range wireless link using a pair of wireless transceivers implemented with any one or a number of wireless technologies including Bluetooth, Zigbee or other wireless technology.

In certain aspects, the processor 204 may be configured to analyze sensor data from the sensor interface 325 to measure environmental conditions external to the communication device 106 (e.g., determine whether a chemical, biological substance, radiation or other contaminate is present). For example, the processor 204 may determine whether a contaminate is present by comparing a level in sensor data received from the sensor interface 325 to a sensor threshold. In this example, the processor 204 may determine that a particular contaminate is present if the level of the sensor data is above the sensor threshold. The processor 204 may determine whether a particular contaminate is present based on sensor data from a plurality of different sensors 320. In one aspect, the processor 204 may execute software which detects a particular contaminate from sensor data by recognizing a pattern in the sensor data that corresponds to the contaminate. The software may employ any number of analytical tools to detect a particular contaminate from sensor data including, but not limited to, a neutral network, principle component analysis, classifiers, and other analytical tools.

After the processor 204 detects a contaminate, the processor 204 may report the detected contaminate to the data fusion center 125 using the network adapter 210. For example, the network adapter 210 may transmit a report of a detected contaminate to a base station 110 and/or wireless access node 140 using a transmitter in the network adapter 210 and an antenna 330. The report may then be routed to the data fusion center 125, for example, through the cellular network 115, the communication network 120, the Internet 155, other network and/or a combination thereof. In certain aspects, the processor 204 may also receive a geographical location of the communication device 106 from the positioning device 315 and include the geographical location in the report. The processor 204 may also include a time stamp in the report indicating an approximate time of the detection. The processor 204 may also include the sensor data from one or more sensors 320 in the report so that the data fusion center 125 can perform an independent analysis of the sensor data. Other types of information that may be included in a report to the data fusion center 125 are described in further detail below.

In certain aspects, the processor 204 may receive messages from the data fusion center 125 using a receiver in the network adapter 210 and perform actions in accordance with the received messages. For example, the processor 204 may configure one or more parameters based on the received messages. The parameters may include parameters that control when the processor 204 transmits a report to the data fusion center 125 or other entity. For example, the parameters may include a reporting interval that controls how often the processor 204 transmits a report, a parameter indicating whether the communication device 106 is to stop reporting, and/or other parameters. The parameters may be stored in the machine-readable media 206. Example of other types of messages and/or parameters are described in further detail below. The data fusion center 125 may send messages to one or more communication devices 106 through the cellular network 115, broadcast network 130, the Internet 155 other network and/or a combination thereof.

Thus, each of the communication devices 106 may be equipped with chemical, biological, radiation and/or other sensors 320. The communication devices 106 may be dispersed throughout a large area, creating a vast network of sensors capable of detecting chemicals, biological substances, radiation and/or other contaminates throughout the large area. Further, each communication device 106 may report a detection of a particular contaminate to the data fusion center 125 over the cellular network 115, the Internet 155, the communication network 120, other network or a combination thereof. This allows the data fusion center 125 to detect contaminates throughout the large area using the sensor network provided by sensor-equipped communication devices 106. The data fusion center 125 may analyze received reports of detection to assess the spread of a contaminate in a geographical area, determine the origin of a contaminate and/ or perform other assessments, as discussed further below.

In certain aspects, the data fusion center 125 may control when the communication devices 120 send reports to prevent overload of the cellular network 125 or other network carrying the reports to the data fusion center 125. In one aspect, the data fusion center 125 may control the communication devices 105 by sending one or more messages to the communication devices 120 that configure one or more parameters that control when the communication devices 106 send reports. The parameters may include a report parameter that indicates whether to stop sending reports, a reporting interval that specifies a time interval between reports, and/or other parameters. For example, the data fusion center 125 may stop reports from communication devices 106 by sending a message to the communication devices 106 to configure the report parameter to stop sending reports. The above parameters, as well as examples of other parameters that the data fusion center 125 may configure, are discussed in further detail below.

Control Based on Geographical Location

In one aspect of the disclosure, the data fusion center 125 may control the number of incoming reports from communication devices 106 by sending messages to communication devices 106 that are within a geographical area to stop sending reports. The geographical area may be defined by a coverage area of one or more base stations 110, a coverage area of one or more transmitters 135, a boundary of a municipality (e.g., city), a predefined geographical area or other technique. The data fusion center 125 may use this type of control, for example, to reduce network congestion due to a large number of reports from communication devices 106 within a certain geographical area.

Upon receiving a message to stop sending reports, a communication device 106 may stop sending reports of contaminate detection to the data fusion center 125 for a predetermined period of time or until instructed to resume sending reports, for example, by the data fusion center 125. In one aspect, the communication device 106 may store a report parameter (e.g., flag) that indicates whether to send a report in a machine-readable medium 206. When the report parameter indicates not to send a report, the communication device 106 does not send a report to the data fusion center 125. Upon receiving a message to stop sending reports, the communication device 106 may configure the report parameter to stop sending reports. The processor 204 may resume sending reports after a period of time has passed and/or when instructed to resume sending reports, for example, by the data fusion center 125.

In one aspect, the communication device 106 may continue to take sensor readings after being instructed to stop sending reports. In this aspect, the communication device 106 may analyze sensor data to determine whether a contaminate is present. If the communication device 106 detects a contaminate, then the communication device 106 may store a report of the detection in the machine-readable medium 206. The report may include a time stamp indicating an approximate time of the detection. When the communication device 106 resumes sending reports to the data fusion center 125, the communication device 106 may send the stored report to the data fusion center 125.

To mitigate network overload when a plurality of communication devices 106 resume sending reports, the communication devices 106 may be programmed to send their stored reports at different times. For example, different communication devices 106 may be programmed to wait for different periods of times before resuming sending reports.

A decision to stop communication devices 106 within a certain geographical area from sending reports may be based on any one of a number of different factors. For example, the data fusion center 125 may decide to stop communication devices 106 within a geographical area from sending reports when a number of reports already received by the data fusion center 125 from the geographical area reaches a certain amount within a period of time. The data fusion center 125 may determine received report within the geographical area based on geographical locations included in the reports or other technique.

The decision to stop communication devices 106 within a geographical area from sending reports may also be made by another entity, such as an administrator and communicated to the data fusion center 125 (e.g., through a user interface 212).

When a decision is made to stop communication devices 106 within a geographical area from sending reports, the data fusion center 125 may send messages to communication devices 106 within the geographical area to stop sending reports.

In one aspect of the disclosure, the geographical area corresponds to a coverage area (cell) of a base station 110, a transmitter 135 and/or an access node 140.

For the example where the desired geographical area corresponds to a coverage area of a base station 110, the data fusion center 125 may send a message to stop sending reports to the cellular network 115 and instruct the cellular network 115 to transmit the message from the base station 110. The cellular network 115 may transmit the message from the base station 100 to communication devices 106 individually using separate channels and/or broadcast the message to multiple communication devices 106 using a common channel shared by the multiple communication devices 106. For example, the cellular network 115 may send the message to the communication devices 106 using broadcast Short Message Service (SMS) and/or individual SMS. As a result, communication devices 106 within the coverage area of the base station 110 receive the message to stop sending reports.

For the example where the desired geographical area corresponds to a coverage area of a transmitter 135, the data fusion center 125 may send a message to stop sending reports to the broadcast network 130 and instruct the broadcast network 130 to broadcast the message from the transmitter 135.

The transmitter 135 may broadcast the message using MediaFLO or other broadcast standard. As a result, communication devices 106 within the coverage area of the transmitter 135 receive the message to stop sending reports.

Figure 4:
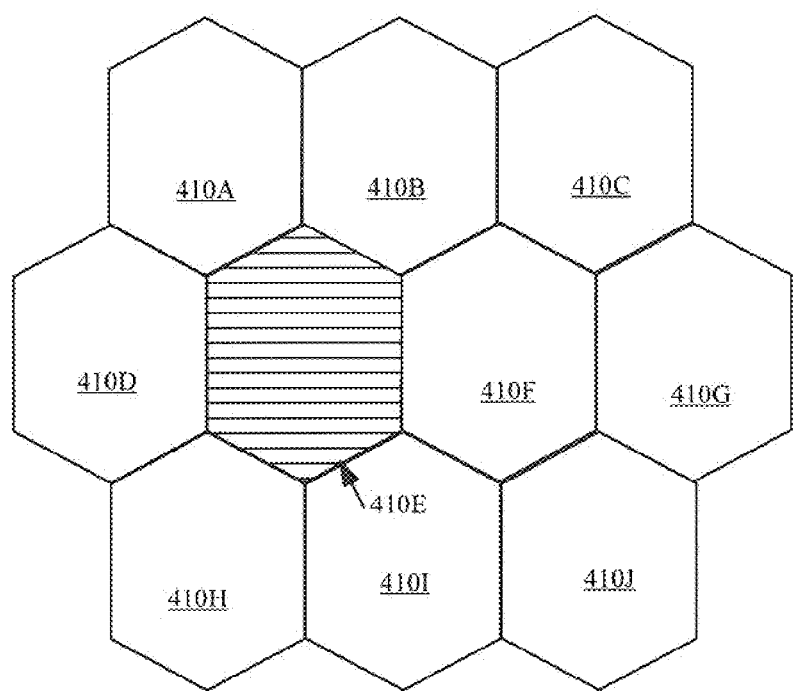
FIG. 4 illustrates a communication system comprising a plurality of coverage areas.

FIG. 4 shows a conceptual diagram of a communication system 405 comprising a plurality of coverage areas 410A-410J. For an example of a cellular system, each coverage area 410A-410J may correspond to a base station 110. In this example, each coverage area 410A-410J may be referred to as a cell. For the example of a broadcast system, each coverage area 410A-410J may correspond to a transmitter 135. The coverage areas 410A-401J may have different shapes and/or sizes from one another. In the example in FIG. 4, the data fusion center 125 sends a message to stop sending reports to communication devices 106 within the coverage area 410E, which is filled in with lines in FIG. 4. A geographical area is not limited to one coverage area 410A-410J and may also be defined by an aggregate of multiple coverage areas 410A-410J.

In one aspect of the disclosure, the data fusion center 125 may specify a geographical area in a message to stop sending reports. For example, the geographical area may be specified by coordinates defining a perimeter of the geographical area. In another example, the geographical area may be specified by an indicator that indicates one of a plurality of predetermined geographical areas stored in the machine-readable medium 206 of a communication device 106. For example, a predetermined geographical area may be defined by the boundary of a city, county, facility, etc. This aspect provides great flexibility in defining geographical areas.

Figure 5:
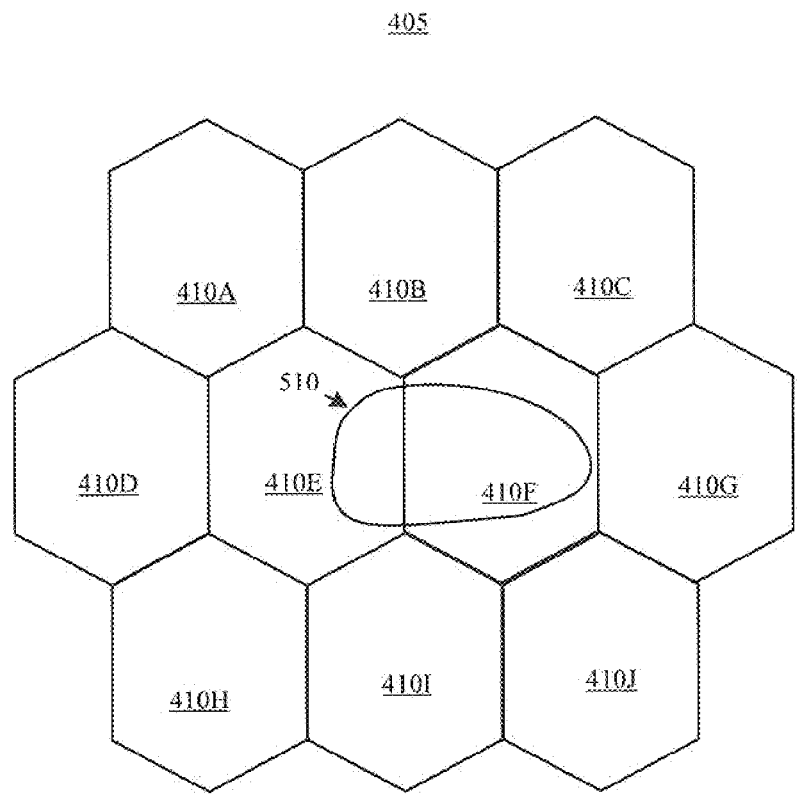
FIG. 5 illustrates an exemplary geographical area overlapping coverage areas in the communication system of FIG. 4.

In this aspect, the data fusion center 125 may transmit the message to stop sending reports from base stations 110 and/or transmitters 135 having one or more coverage areas 410A-410J overlapping the specified geographical area. FIG. 5 illustrates a geographical area 510 overlapping coverage areas 410E and 410F. In this example, the message to stop sending reports may be transmitted within coverage areas 410E and 104F from corresponding base stations 110 and/or transmitters 135.

Upon receiving a message to stop sending reports, a communication device 106 may determine whether the communication device 106 is located within the geographical area specified in the message. The communication device 106 may make this determination by comparing a geographical location of the communication device 106 to the specified geographical area. The geographical location of the communication device 106 may be provided by a positioning device 315 of the communication device 106. If the communication device 106 determines that the communication device 106 is within the geographical area specified in the received message, then the communication device 106 stops sending reports for a period of time or until instructed to resume sending reports. If the communication device 106 is outside the specified geographical area, then the communication device 106 may send a report. In this aspect, the geographical area specified in the received message and the geographical location of the communication device 106 may be stored as parameters in the machine-readable medium 206 of the communication device 106.

In one aspect of the disclosure, the data fusion center 125 may identify which communication devices 106 are within a geographical area based on previously received reports from the communication devices 106. In this aspect, each previously received report may include a geographical location of the respective communication device 106. The data fusion center 125 may use the geographical locations in the previously received reports to identify which communication devices 106 are within a geographical area of interest. The data fusion center 125 may then send a message to stop sending reports to communication devices 106 within the geographical area by sending the message to the identified communication devices 106. In this aspect, the data fusion center 125 may direct the message to the communication devices 106 individually since the data fusion center 125 has identified the communication devices 106 instead of broadcasting the message to multiple communication devices 106 in the geographical area.

In one aspect of the disclosure, the data fusion center 125 may instruct a percentage of communication devices 106 within a geographical area to stop sending reports. The data fusion center 125 may do this, for example, by sending a message to stop sending reports to a percentage of the communication devices 106 within the geographical area. The data fusion center 125 may identify communication devices 106 within the geographical area based on previously received reports, as discussed above, and send the message to stop sending reports to a percentage of the identified communication devices 106.

In another example, each communication device 106 may be allocated one of a plurality of different numbers, which may be stored in the machine-readable medium 206 of the communication device 106. A communication device 106 may be allocated a number randomly or using other methods. One or more communication devices 106 may be allocated the same number. In this example, each of the plurality of numbers may be allocated to a certain percentage of the communication devices 106. The data fusion center 125 may then control the percentage of communication devices 106 that stop reporting within a geographical area by including one or more of the numbers in a message to stop reporting, as discussed further below.

Upon receiving a message to stop reporting, a communication device 106 may compare the one or more numbers in the message with the number allocated to the communication device 106. The communication device 106 may then determine whether to stop sending reports to the data fusion center 125 based on the comparison. For example, the communication device 106 may determine to stop sending reports if the number allocated to the communication device 106 matches a number in the message. In this example, the data fusion center 125 may instruct a desired percentage of communication devices 106 to stop sending reports by including, in a message to stop sending reports, one or more numbers that are allocated to the desired percentage of communication devices 106. For example, if 50% of the communication devices 106 are allocated numbers 1 through 5 and the data fusion center 125 desires to stop 50% of the communication devices 106 from sending reports, then the data fusion center 125 may include the numbers 1 through 5 in the message. Communication devices 106 having allocated numbers that do not match the number in the message may continue to send reports to the data fusion center 125.

Alternatively, a communication device 106 may determine to stop sending reports if the number allocated to the communication device 106 does not match any of the numbers in the message. In this example, the data fusion center 125 may instruct a desired percentage of communication devices 106 to stop sending reports by excluding, in a message to stop sending reports, one or more numbers that are allocated to the desired percentage of communication devices 106.

The number allocated to a communication device 106 and the one or more numbers in a message received by the communication device 106 may be stored as parameters in the machine-readable medium 206 of the communication device 106.

This aspect of the disclosure allows the data fusion center 125 to stop a percentage of communication devices 106 within a geographical area from sending reports (e.g., to reduce network congestion) while continuing to receive reports from the remaining communication devices 106 within the geographical area. In this aspect, the data fusion center 125 may adjust a number of reported detections within a geographical area based on the percentage of communication devices 106 instructed to stop reporting within the geographical area. For example, if 50% of the communication devices 106 are instructed to stop reporting within a geographical area (e.g., to reduce network congestion), then the data fusion center 125 may double the number of reported detections to take into account that 50% of the communication devices 106 have stopped reporting.

The percentage of communications devices 106 instructed to stop reporting may also be determined based the population density of a geographical area. For example, the percentage by be higher for higher population densities.

Control Based on Range and Cell ID

In an aspect of the disclosure, the data fusion center 125 may control which communication devices 106 send reports based on a range (e.g., distance) from a base station 110, transmitter 135 and/or access node 140. This aspect allows the data fusion center 125 to define a geographical area by a range from a base station 110, a transmitter 135 and/or an access node 140. The range from the base station may be given as an estimated distance from the base station 110 or a timing measurement of signals received from the base station 110.

Figure 6:
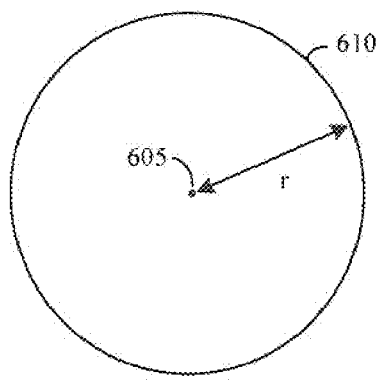
FIG. 6 illustrates an exemplary geographical area defined by a range from a base station or transmitter.

FIG. 6 shows an example of a geographical area 610 defined by a range r from a location 605 of a base station 110. In this example, the geographical area 610 comprises a circle centered at the location 605 of the base station 100 and having a radius approximately equal to the range r.

In this aspect, the data fusion center 125 may include a range from a base station 110 in a message to stop sending reports and instruct the cellular network 115 to transmit the message from the base station 110. Upon receiving the message, the communication device 106 may determine whether the communication device 106 is within the specified range from the base station 110. For example, the communication device 106 may determine its range from the base station 110 and determine whether this range is equal to or less than the range in the received message. If the communication device 106 is within the range specified in the message, then the communication device 106 stops sending reports to the data fusion center 125. The range in the received message may be stored as a parameter in the machine-readable medium 206 of the communication device 106.

A communication device 106 may determine its range (e.g., distance) from a base station 110 using a number of techniques. For example, the communication device 106 may estimates its range from the base station 110 by analyzing timing measurements and/or power measurements of signals received from the base station 110. The communication device 106 may also estimate the range using measurements of neighboring transmitters or non-network transmitters, such as satellite positioning networks (e.g., GPS, Galileo, etc.) or other networks (e.g., IEEE 802.11).

The data fusion center 125 may also instruct communication device 106 to stop reporting within a particular cell (coverage area of a base station 110) by including, in a message to stop sending reports, a cell ID identifying the corresponding cell. The message may be sent over the cellular network 115 or other network. For example, the message may be sent over the broadcast network 130 and transmitted from one or more transmitters 135 having coverage areas overlapping the cell so that communication devices 106 within the cell receive the message.

Upon receiving the message, a communication device 106 may compare the cell ID in the message with a cell ID of the cell currently serving the communication device 106. If the two cell IDs match, then the communication device 106 may configure the report parameter to stop sending reports to the data fusion center 125. Thus, the data fusion center 125 may instruct communication devices 106 cell to stop sending reports by including the corresponding cell ID in a message to the communication devices 106.

Control Based on Sensor Type

In an aspect of the disclosure, the data fusion center 125 may control which reports are sent to the data fusion center 125 by sensor type. In an aspect, a communication device 106 may comprise a plurality of sensors 330 configured to detect different types of contaminates. In this aspect, a sensor type of a sensor 320 may refer to a type of chemical, biological substance and/or radiation that the sensor is configured to detect. For example, a sensor configured to detect Anthrax may be referred to as an Anthrax-type sensors 330. A sensor 320 may also be configured to detect multiple types of contaminates. Thus, a sensor 320 may correspond to multiple sensor types.

In one aspect, the data fusion center 125 instructs communication devices 106 to stop sending reports for a certain sensor type by including, in a message to stop sending reports, an identifier identifying the sensor type. For example, the data fusion center 125 may instruct communication devices 106 to stop sending reports for Anthrax by including, in a message to stop sending reports, an identifier identifying Anthrax-type sensor.

Upon receiving a message to stop sending reports, a communication device 106 may stop sending reports for a sensor type identified in the message. In an aspect, the communication device 106 may store a parameter that identifies a sensor type for which the communication device 106 is to stop sending reports. When the communication device 106 receives a sensor type in the message, the communication device 106 may enter the sensor type in the parameter. When the communication device 106 detects a contaminate from a sensor reading, the communication device 106 checks the sensor type to determine whether the detected contaminate matches the sensor type. If the detected contaminate matches the sensor type, then the communication device 106 does not send a report of the detection to the data fusion center 125.

A decision to stop communication devices 106 from sending reports for a certain sensor type may be based on any one of a number of different factors. For example, the data fusion center 125 may decide to stop communication devices 106 from sending reports for a certain sensor type when the data fusion center 125 has already received a large number of reports for a particular contaminate within a geographical area. In this example, the data fusion center 125 may conclude that the received reports are already sufficient to establish the presence of the detected contaminate within the geographical area. The data fusion center 125 may then send a message to communication devices 106 within the geographical area to stop sending reports for the corresponding sensor type. The data fusion center 125 may do this to free up network resources for other types of sensors.

This aspect allows the data fusion center 125 to stop additional reports for a sensor type (e.g., to reduce network congestion) when the presence of the corresponding contaminate has already been established from previous reports. Further, this aspect allows the data fusion center 125 to continue to receive reports for other types of sensors.

In one aspect, the data fusion center 125 may instruct a percentage of communication devices 106 within a geographical area to stop sending reports for a certain sensor type. The data fusion center 125 may do this using the techniques discussed above or other technique.

In one aspect, the data fusion center 125 may instruct communication devices 106 that have already sent a report for a certain sensor type to the data fusion center 125 to stop sending additional reports for the same sensor type. Thus, the data fusion center 125 can limit the number of incoming reports for a certain sensor type (e.g., to reduce network congestion) while not affecting reports for other sensor types.

Figure 7:
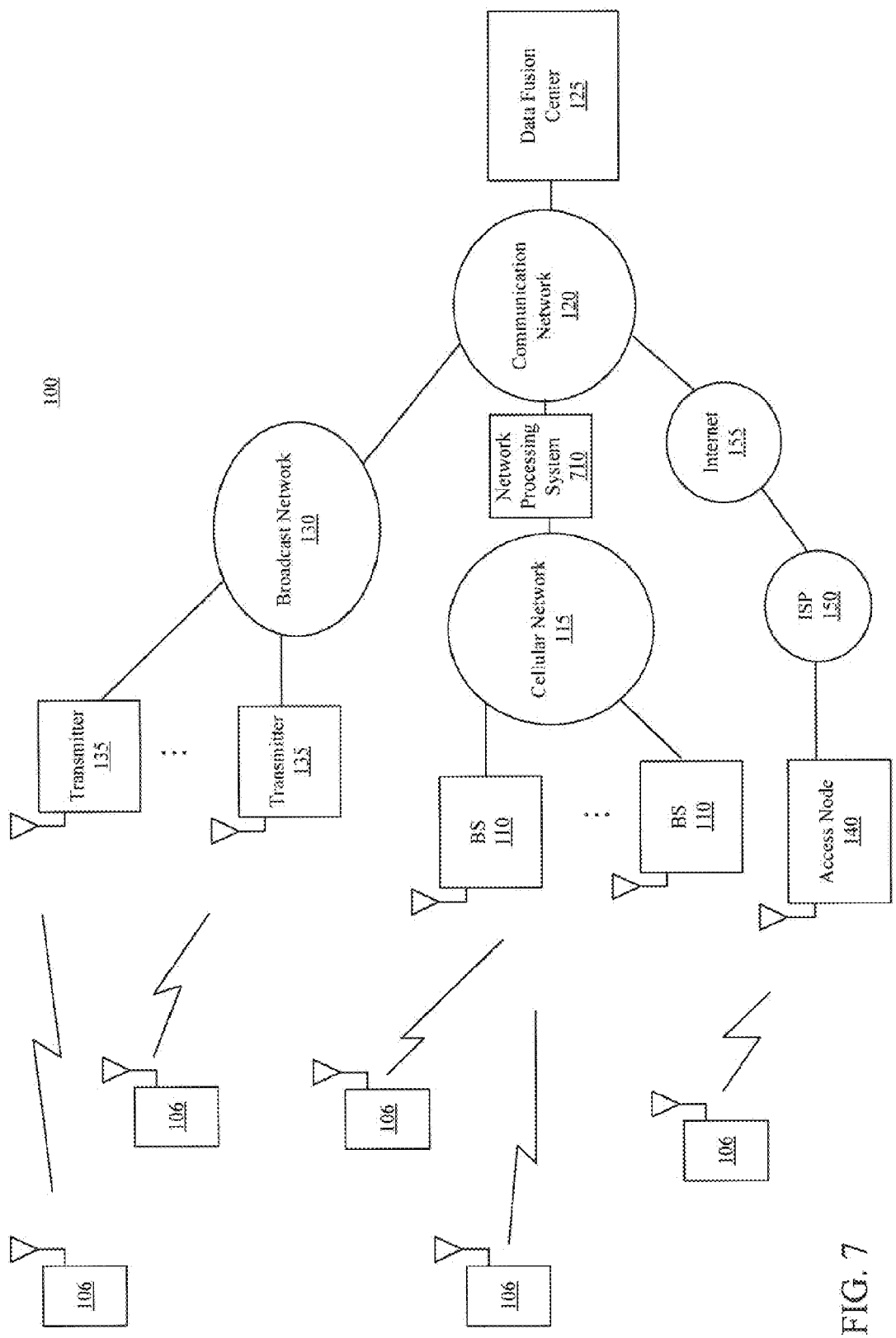
FIG. 7 is a conceptual block diagram of the exemplary communication system in FIG. 1 including an exemplary network processing system.

FIG. 7 shows a conceptual block diagram of a network processing system 710 positioned along one or more data paths between the communication devices 106 and the data fusion center 125. The network processing system 710 may be implemented using the processing system 200 illustrated in FIG. 2 or other architecture. Although the network processor system 710 is shown between the cellular network 115 and the communication network 120 in the example in FIG. 7, the network processing system 710 may be positioned anywhere in the communication system 110 between the communication devices 106 and the data fusion center 125.

In one aspect, the network processing system 710 intercepts incoming reports from the communication devices 106 to the data fusion center 125 and filters out a percentage of the reports based on one or more criterions. This may be done, for example, to reduce the load on the data fusion center 125. In this aspect, the network processing system 710 may use a network adapter 210 to intercept reports (e.g., from the cellular network) and to forward intercepted reports (e.g., communication network 120 or directly to the data fusion center 125).

In one aspect, the processor 204 of the network processing system 710 may filter out a percentage of reports for a certain sensor type. In this aspect, the processor 204 may scan the contents of a report to identify the sensor type of the report. For example, the report may include an indicator indicating the sensor type of the report and the processor 204 may check the indictor in the report to identify the sensor type of the report. If the identified sensor type of the report matches the sensor type being filtered, then the processor 204 may filter out the report based on the percentage of reports for the sensor type being filtered out. For example, if the percentage of reports for the sensor type to be filtered out is 50%, then the processor 204 may filter out every other report matching the sensor type. Reports that are not filter out may be forwarded to the data fusion center 125.

The network processing system 710 may receive a message from the data fusion center 125 specifying which sensor type to filter out and the percentage of reports for the sensor type to filter out. The network processing system 710 may store the received message in a machine-readable medium 206 and filter reports based on the stored message.

The network processing system 710 may also dynamically adjust the percentage of reports that are filtered out for a certain sensor type. For example, the network processing system 710 may adjust the percentage based on a load capacity of the data fusion center 125. In this example, the network processing system 710 may filter out reports that exceed a report rate set by a load capacity of the data fusion center 710. The report rate may be a number of reports over a period of time. In this example, the network processing system 710 may determine the percentage of reports being filtered out based on the number of reports filtered out over the total number of reports and communicate the percentage to the data fusion center 125.

The data fusion center 125 may use information on the percentage of reports filtered out to estimate the number of reports for a certain sensor type that are transmitted from communication devices 106. For example, if 50% of reports for the sensor type are filtered out by the network processing system 710 and the data fusion center 125 receives 1,000 reports, then the data fusion center 125 may estimate that 2,000 reports were actually transmitted from communication devices 106 to take into account the percentage of reports filtered out.

Control Using Priority Class Scheme

In an aspect of the disclosure, the data fusion center 125 may control which communication devices 106 send reports based on a priority class scheme. In one aspect, each communication device 106 may be allocated one of a plurality of different priority numbers. The different priority numbers may indicate different levels of priority. During an emergency, the cellular network 115 may restrict phone calls to communication devices 106 having certain priority numbers. An example of a priority class scheme is Access Overload Control (ACCOLC), in which communication devices 106 are allocated a priority number in the range of 0-15. The priority numbers in the range of 0-9 may be randomly allocated to most communication devices 106. Higher priority numbers in the range of 10-15 may be allocated to communication devices 106 for higher priority users. During an emergency, the cellular network 115 may restrict phone calls to communication devices 106 having certain priority numbers (e.g., 1, 3, 10-15).

A communication device 106 may store its priority number in a machine-readable medium 206. For example, the priority number may be stored in a Subscriber Identity Module (SIM) stored in the machine readable medium 206 of the communication device 106.

In one aspect, the data fusion center 125 may use the priority numbers allocated to the communication devices 125 to control a percentage of communication devices 106 that send reports. To do this, the data fusion center 125 may include one or more priority numbers in a message to stop sending reports and send the message to communication devices within a geographical area, for example, through the cellular network 115, broadcast network 130 or other network. Upon receiving the message, the a communication device 106 may compare the priority number of the communication device 106 to the one or more priority numbers in the message. If the priority number of the communication device does not match any of the priority numbers in the message, then the communication device 106 does not send reports to the data fusion center 125. This aspect allows the data fusion center 125 to reduce network congestion by restricting the number of communication devices 106 that send reports from a geographical area. The one or more priority numbers in the received message and the priority number allocated to the communication device 106 may be stored as parameters in the machine-readable medium 106 of the communication device 106.

In one aspect, a communication device 106 may include a plurality of priority numbers for prioritizing different classes of services. The different classes of services may include voice, web browsing, sensor reporting, administrative transactions, etc. In this aspect, each class of service may be allocated one of the plurality of priority numbers for prioritizing classes of services. For example, a class of service given high priority may be allocated a priority number corresponding to a high priority. A communication device 106 may store the plurality of priority numbers and one or more classes of services for each priority number in the machine-readable medium 206 of the communication device 106.

In this aspect, the data fusion center 125 may restrict communication devices 106 to certain classes of services by including one or more of the priority numbers for prioritizing classes of services in a message to the communication devices 106. Upon receiving the message, a communication device 106 may lookup the classes of services in the machine-readable medium 206 that correspond to the one or more priority numbers in the received message. The communication device 106 may then allow the classes of services corresponding to the one or more priority number in the received message while blocking the other classes of services.

This aspect allows the data fusion center 125 to restrict which classes of services are used by the communication devices 106. For example, during an emergency, the data fusion center 125 may restrict communication devices 106 to sending reports and/or high priority classes of services while blocking other classes of services to reduce network congestion.

Measure Network Congestion

In an aspect of the disclosure, a communication device 106 measures congestion of a network and determines whether to send a report based on the measured network congestion.

In one aspect, a communication device 106 measures cellular network congestion by monitoring a paging channel of a base station 100. The communication device 106 may monitor the paging channel using a receiver in the network adapter 210. In one aspect, the communication device 106 monitors the paging channel to determine a number of free slots on the paging channel. Free slots indicate that there are not enough messages going to users to consume the channel, and therefore, that the network is not fully congested. The communication device 106 may then compare the number of free slots on the paging channel to a threshold. If the number of free slots is below the threshold, then the communication device 106 may determine that the network is congested and stop sending reports to the data fusion center 125. The communication device 106 may continue to monitor the paging channel and compare the number of free slots on the paging channel to the threshold. When the number of free slots is equal to or above the threshold, the communication device 106 may resume sending reports to the data fusion center 125.

In one aspect, the communication device 106 measures congestion of a network by measuring latency of the network. For example, the communication device 106 may measure latency of a network based on an amount time between the time the communication device 106 sends data to the network and the time the communication device 106 receives a response to the data from the network. For example, the communication device 106 may measure latency of the cellular network 115 based on an amount of time the communication device 106 sends a request to the cellular network 115 and the time the communication device 106 receives an acknowledgement of the request from the cellular network 115. The communication device may then compare the measured network latency to a threshold (e.g., 30 seconds). If the measured network latency is above the threshold, then the communication device 106 may retry sending the data a plurality of times and measure the network latency each time. If the measure latency is above the threshold each time, then the communication device 106 may determine that the network is congested and stop sending reports to the data fusion center 125. After a period of time has passed, the communication device 106 may measure the network latency again. If the network latency falls below the threshold, then the communication device 106 may resume sending reports.

This aspect allows a communication device 106 to measure network congestion itself and determine whether to send a report based on the measured network congestion. Thus, the communication devices 106 may automatically back off sending reports when a network becomes congested, thereby relieving network congestion.

Requesting Reports in a Geographical Area

In an aspect of the disclosure, the data fusion center 125 may send a request to communication devices 106 within a geographical area to send a report. For example, the data fusion center 125 may send a request to communication devices 106 with a geographical area to send a report for a particular type of contaminate. In this example, the data fusion center 125 may include a sensor type in the request corresponding to the desired contaminate. Upon receiving the request, a communication device 106 may take a sensor reading from a corresponding sensor 320 of the communication device 106. The communication device 106 may then determine whether the contaminate is present from the resulting sensor data and send a report to the data fusion center 125 indicating whether the contaminate is detected. The received request including the sensor type may be stored as parameters in the machine-readable medium 206 of the communication device 106.

Figure 8A:
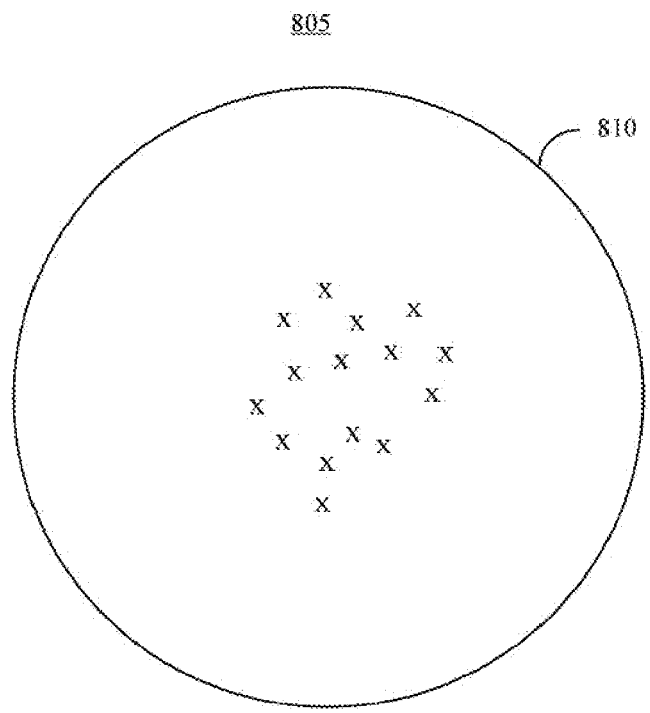
FIGS. 8A-8C illustrate examples of spatial maps showing locations of reported detections within a geographical area.

By way of example, the data fusion center 125 may send a request for reports to assess the spread of a contaminate. FIG. 8A illustrates a spatial map 805 plotting locations where a particular contaminate has been detected. Each location is denoted by an x and may correspond to a location of a communication device 106 reporting a detection. The data fusion center 125 may estimate an origin of the contaminate based on a location in the center of the reported detections or the locations of the earliest reported detections.

In this example, the data fusion center 125 may send a request to communication devices 106 within the geographical area 810 to send a report for the particular contaminate. Upon receiving the request, a communication device 106 may report back to the data fusion center 125 whether the particular contaminate is detected.

In one aspect, the data fusion center 125 may include, with a request to report a particular contaminate, a message to take sensor readings for the particularly contaminate often (short time interval between sensor readings) and to immediately report a detection to the data fusion center 125. For example, the message may include a time interval between sensor readings. In this example, a communication device 106 may store the time interval as a parameter in the machine-readable medium 206 and take sensor readings for the contaminate indicated in the request based on the stored time interval. In this aspect, the request may include a message not to report negative detections so the communication device 106 does not load the network when the contaminate is not detected.

When communication devices 106 within the geographical area 810 send reports of detection for the contaminate to the data fusion center 125, the data fusion center 125 may update the spatial map 805 accordingly. For example, each report of a detection may include a geographical location of the detection (e.g., using a positioning device 310 of the respective communication device 106). As the data fusion center 125 receives reports of detection, the data fusion center 125 may add the locations of the detections to the spatial map 805. This allows the data fusion center 125 to assess the spread of the contaminate. The data fusion center 125 may display the spatial map 805 or similar information to an administrator (e.g., using a user interface 212) so that the administer can monitor the spread of the contaminate.

Figure 8B:
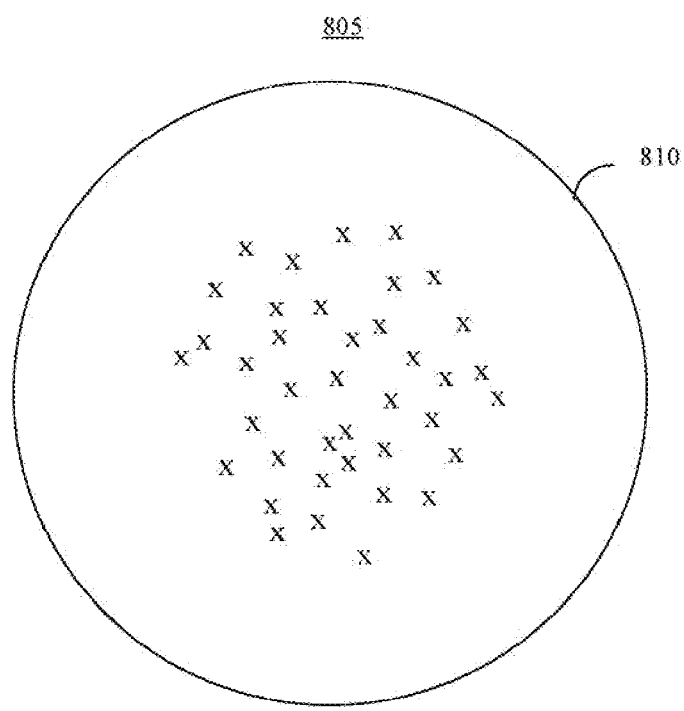

FIG. 8B shows the spatial map 805 after being updated with additional detections over a period of time. In the examples shown in FIGS. 8A and 8B, the contaminate being monitored has spread over the period of time. As the locations of detections approach the boundary of the geographical area 810, the data fusion center 125 may expand the size of the geographical area 810.

In one aspect, each received report reporting a detection may include a time stamp indicating an approximate time of the detection. In this aspect, the data fusion center 125 may estimate a speed at which the contaminate travels by computing a distance between two reported detections and dividing the distance by a time difference between the two reported detections. The data fusion center 125 may use other techniques to estimate the speed of the contaminate.

The geographical area 810 may be defined by the coverage area of a base station 110, transmitter 135 and/or access node 140, boundary of a municipality, or other area. The geographical area 810 may also be based on a prediction of the spread of the contaminate (e.g., based on wind conditions, known properties of the contaminate, etc.).

The data fusion center 125 may send the request for reports to communication devices 106 within the desired geographical area using any of the techniques discussed above or other technique. For example, when the geographical area corresponds to a coverage area of a base station 110, the data fusion center 125 may instruct the cellular network 115 to broadcast the request from the base station 110.

To avoid network congestion due to a large number of reports in response to a request, the data fusion center 126 may instruct a percentage of communication devices 106 within the geographical area not to report using any of the techniques discussed above or other technique. For example, in a densely populated area (e.g., city), the data fusion center 125 may instruct a percentage of communication devices 106 not to report to avoid network congestion.

Figure 8C:
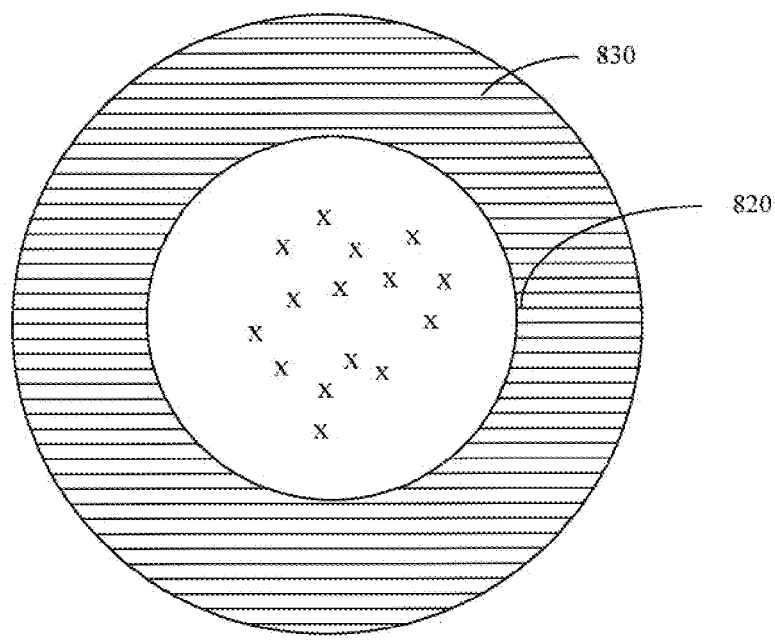

In one aspect, the data fusion center 125 may determine a geographical area based on a boundary of the contaminate detections. FIG. 8C illustrates an example of a geographical area 820 based on a boundary of the contaminate detections. In this example, the data fusion center 125 may fit a perimeter of the geographical area 820 along the outermost locations of the reported contaminate detections.

In one aspect, the data fusion center 125 may conclude that the presence of the detected contaminate has already been established within the geographical area 820. The data fusion center 125 may then send a request for reports to communication devices 106 outside of the geographical area 820. For example, the data fusion center 125 may send a request for reports to communication devices 106 within a geographical area 830 that is adjacent to the geographical area 820 to assess the spread of the contaminate beyond the geographical area 820. In the example shown in FIG. 8C, the geographical area 830, which is filed in with lines, surrounds the geographical area 820. The data fusion center 125 may send a request for reports to communications devices 106 within the adjacent geographical area 830 to avoid network congestion from communication devices 106 within the geographical area 820 where the presence of the detected contaminate has already been established. The adjacent geographical area 830 may be defined using any of the techniques discussed above or other technique. Although, the example in FIG. 8C shows the adjacent geographical area 820 completely surrounding the geographical area 820, the geographical area 830 need not completely surround the geographical area 820.

In one aspect, when the data fusion center 125 receives a report reporting detection of a contaminate from a communication device 106, the data fusion center 125 may send a request for reports to other neighboring communication devices 106 to verify the reported detection. For example, when the data fusion center 125 receives a report of a particular contaminate from a communication device 106, the data fusion center 125 may determine the location of the detection (e.g., using a location in the received report). The data fusion center 125 may then determine a geographical area that encompasses the location of the detection and send a request to communication devices 106 within the geographical area for reports for the detected contaminate.

Upon receiving the request, a communication device 106 may take a sensor reading from a corresponding sensor 320 of the communication device 106. The communication device 106 may then determine whether the requested contaminate is present from the resulting sensor data and send a report to the data fusion center 125 indicating whether the contaminate is detected. The communication device 106 may also include a geographical location of the communication device 106 in the report.

When the data fusion center 125 receives a report from another communication device 106 in response to the request, the data fusion center 125 may determine whether the report includes a detection for the contaminate. The data fusion center 125 may also determine a distance between the report being verified and the report from the other communication device 106 (e.g., based on locations in the two reports). The data fusion center 125 may use this information to consider reports from communication devices 106 that are within a certain distance from the report being verified. If none of the reports from the other communication devices 106 being considered detect the contaminate, then the data fusion center 125 may conclude that the detection in the report being verified is a false detection. A false detection may also be referred to as a false positive. In this case, the data fusion center 125 may take one of several actions with respect to the communication device 106 that sent the false report. For example, the data fusion center 125 may ignore future reports for the falsely detected contaminates from the communication device 106 and/or send a message to the communication device 106 not to send reports for the falsely detected contaminate. In another example, the data fusion center 125 may recalibrate the communication device 106, as discussed further below.

In one aspect, the data fusion center 125 may determine communication devices 106 that are within a certain distance from a report being verified based on previous reports from the communication devices 106. Each previous report may include a location (e.g., provided by a positioning device 310 of the respective communication device 106). In this aspect, the data fusion center 125 determines whether a communication device 106 is within a certain distance from the report being verified by comparing a location in a previous report from the communication device 106 to a location in the report being verified. If the data fusion center 125 determines that the communication device 106 is within a certain distance from the report being verified based on the comparison, then the data fusion center 125 may send a request for a report for the detected contaminate to the communication device 106. The data fusion center 125 may direct the request for the report to the communication device 106 (e.g., using a phone number and/or address of the communication device 106). Upon receiving a report from the communication device 106 in response to the request, the data fusion center 125 may check a location in the received report to verify that the communication device 106 is indeed within the certain distance from the report being verified. If data fusion center 125 verifies that the communication device 106 is within the certain distance from the report being verified, then the data fusion center 125 may consider the received report to determine whether the detection in the report being verified is accurate, as discussed above.

Calibrate Sensitivity

In an aspect of the disclosure, a communication device 106 may include a sensor threshold for each type of contaminate the communication device 106 is configured to detect. Each sensor threshold may be stored as a parameter in the machine-readable medium 206 of the communication device 106. In one aspect, a communication device 106 may determine whether a particular contaminate is present by taking a reading from a corresponding one or more of the sensors 330 of the communication device 106. The communication device may then compare the sensor threshold for the particular contaminate to a level of the resulting sensor data to determine whether the particular contaminate is present. The level of the sensor data may comprise a numerical value, which may correspond to a characteristic of the data sensor including, but not limited to, an amplitude, an amplitude within a frequency band, a pattern of the sensor data or other characteristic of the sensor data. If the level of the sensor data is above the sensor threshold, then the communication device 106 may determine that the corresponding contaminate is present.

In one aspect, the sensor threshold for a particular contaminate may be adjusted to adjust the sensitivity of the communication device 106 for the contaminate. For example, the sensor threshold may be decreased to increase sensitivity for the contaminate. In another example, the sensor threshold may be increased to decrease the likelihood of a false detection (false positive).

In one aspect, the data fusion center 125 may send a message to a communication device 106 to adjust the sensor threshold for a particular contaminate. For example, if the data fusion center 125 receives a false detection for a particular contaminate from a communication device 106, then the data fusion center 125 may send a message to the communication device to increase the corresponding sensor threshold to prevent future false detections. The data fusion center 125 may determine the false detection based on reports from other neighboring communication devices 106, as discussed above. In this aspect, the message from the data fusion center 125 may include an amount by which to adjust the sensor threshold stored in the communication device 106 and/or a new sensor threshold.

Upon receiving the message, a communication device 106 may adjust the sensor threshold by an amount indicated in the message and store the updated sensor threshold in the machine-readable medium 206. Alternatively, the communication device 106 may replace the sensor threshold stored in the machine-readable medium 206 with a new sensor threshold in the message. The sensor threshold may be stored as a parameter in the machine-readable medium 206 of the communication device 106.

In one aspect, the data fusion center 125 may determine a sensor threshold for a communication device 106 by analyzing historical sensor data from the communication device 106 for the corresponding contaminate over a period of time. In this aspect, the data fusion center 125 may send a request to a communication device 106 for historical sensor data for a contaminate over a period of time. In this aspect, the communication device 106 may automatically store sensor data over an extended period of time in the machine-readable medium 206.

Upon receiving the request, the communication device 106 may retrieve the requested historical sensor data from the machine-readable medium 206 and send the retrieved historical sensor data to the data fusion center 125 along with the corresponding sensor threshold. The data fusion center 125 may then analyze the received historical sensor data and sensor threshold to determine whether to adjust the sensor threshold of the communication device 106.

Figure 9:
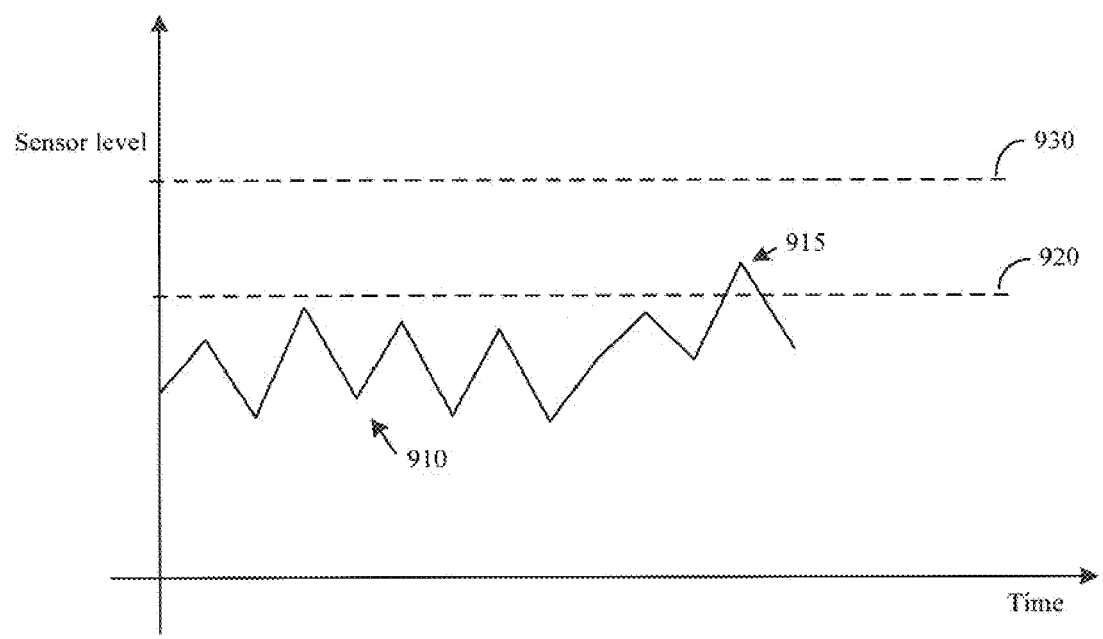
FIG. 9 illustrates a plot of historical sensor data over a period of time.

FIG. 9 is a plot showing an example of historical sensor data 910 for a sensor 320 of a communication device 106 taken over a period of time and a sensor threshold 920. The plot comprises a vertical axis for sensor level and a horizontal axis for time. In this example, the sensor data 910 crosses above the threshold 920 at time 915 triggering a detection for the corresponding contaminate and causing the communication device 106 to send a report of detection to the data fusion center 125. Upon receiving the report of detection, the data fusion center 125 may determine that the detection is false based on reports of negative detection from neighboring communication devices 106, as discussed above.

After determining that the detection is false, the data fusion center 125 may request the historical sensor data 910 from the communication device 106 sending the false detection and analyze the received historical sensor data 910. In the example shown in FIG. 9, the data fusion center 125 may determine that the background level for the contaminate in close to the sensor threshold 920 based on the historical data 910. Based on this determination, the data fusion center 125 may determine that the communication device 106 is susceptible to false detections for the current sensor threshold 920 of the communication device 106. The data fusion center 125 may then increase the sensor threshold to a new sensor threshold 930 to prevent future false detections from the communication device 106 and communicate the new sensor threshold 930 to the communication device 106.

Thus, the data fusion center 125 may calibrate the sensitivity of a sensor 320 of a communication device 106 by adjusting the corresponding sensor threshold. The data fusion center 125 may adjust the sensor threshold based on an analysis of historical sensor data from the communication device 106. For example, if the historical data indicates that the background level for a contaminate is higher than normal, then the data fusion center 125 may increase the sensor threshold to a new sensor threshold and communicate the new sensor threshold to the communication device. For example, the background level for radiation may increase when the communication device 106 is moved near a nuclear test site in Nevada.

In one aspect, the data fusion center 125 may periodically request and analyze historical sensor data for a sensor from a communication device 106 and adjust the corresponding sensor threshold accordingly. For example, a sensor 320 may normally degrade over time requiring that the sensor threshold be increased or decreased over time. In this example, the data fusion center 125 may monitor the degradation of the sensor 320 over time by periodically requesting and analyzing historical data from the communication device 106 and adjust the corresponding sensor threshold accordingly. For example, if a sensor 320 becomes less sensitive over time, then the data fusion center 125 may detect this loss of sensitivity by a corresponding drop in the historical sensor data. The data fusion center 125 may then decrease the sensor threshold accordingly. If the data fusion center 125 determines that the sensor has degraded to a point where the sensor 320 is no longer useful based on the historical sensor data, then the data fusion center 125 may send a message to the communication device 106 to stop using the sensor 320.

In another example, a background level for a chemical, biological substance and/or radiation may change over time. For example, a background level for chlorine may increase if a communication device 106 is moved near a swimming pool. In this example, the data fusion center 125 may detect the increased background level for chlorine by a corresponding increase in historical data from the communication device 106 over a period of time. The data fusion center 125 may then increase the sensor threshold accordingly to prevent a false detection of a chlorine gas attack. A background level of a contaminate may be due to trace amounts of the contaminate that occurs normally and does not pose a threat (e.g., terrorist attack).

These aspects of the disclosure allow the data fusion center 125 to adjust a sensor threshold of a communication device 106 based on degradation of a sensor over time, changes in the environment, physical characteristics of a sensor, etc.

Control Based on Geographical Area of Communication Device

In certain aspects, a communication device 106 may be programmed to adjust a reporting parameter based on a geographical area in which the communication device is located. The reporting parameter may include a sensor threshold, a reporting interval or other reporting parameter. In one aspect, the communication device 106 may store a plurality of geographical areas in the machine-readable medium 206 and one or more reporting parameters for each of the plurality of geographical areas. Each geographical area may be defined by a state, county, city facility, coverage area of a base station 110, coverage area of a transmitter 135, etc.

In one aspect, a communication device 106 may determine in which of the plurality of geographical areas the communication device 106 is currently located and use the reporting parameters (e.g., sensor threshold for a sensor) corresponding to the determined geographical area. The communication device 106 may determine in which geographical area its is located using a positioning device 315.

In one aspect, for each of the plurality of geographical areas, the communication device 106 stores a sensor threshold for a sensor 320 in the machine-readable medium 206. In this aspect, the communication device 106 may determine in which of the plurality of geographical areas the communication device 106 is currently located and use the stored sensor threshold for the determined geographical area to detect the corresponding contaminate. In this aspect, the sensor threshold for each of the plurality of geographical areas may be based on a characteristic of the geographical area. For example, the sensor threshold may be higher for a geographical area having a higher background level for the corresponding contaminate than other geographical areas.

In one aspect, the data fusion center 125 may send a communication device 106 updated reporting parameters for one or more of the plurality of geographical areas. Upon receiving updated reporting parameters for one of the plurality of geographical areas, the processor 204 of a communication device 106 may replace the previously stored reporting parameters for the geographical area with the updated reporting parameters. For example, the data fusion center 125 may send an updated sensor threshold for a geographical area (e.g., city) when a terrorist threat for the corresponding contaminate is reported in the geographical area. In this example, the updated sensor threshold may be lower than the previously stored sensor threshold for the geographical area to increase the sensitivity of the communication device 106 for the corresponding contaminate.

Control Based on Multiple Sensors of Communication Device

In an aspect of the disclosure, a communication device 106 may be configured to adjust a reporting parameter (e.g., sensor threshold) for a sensor 320 of interest based on measurements from another sensor 320 of the communication device 106. In one aspect, the other sensor 320 may measure an environmental condition that affects the sensor 320 of interest. For example, the other sensor 320 may comprise a humidity sensor that measures humidity affecting the sensitivity of the sensor 320 of interest. Other sensors 320 that measure environmental conditions affecting the sensor 320 of interest may also be used including, but not limited to, pressure sensors, temperature sensors and/or other sensors.

In one aspect, the communication device 106 may adjust the sensor threshold for the sensor 320 of interest based on a measurement of an environmental condition (e.g., humidity, temperature or other condition) from the other sensor 320. In this aspect, the communication device 106 may store different ranges of the environmental condition and a sensor threshold for each range of the environmental condition in the machine-readable medium 206. The communication device 106 may determine in which range of the environmental condition a current measurement of the environmental condition belongs and use the sensor threshold corresponding to the determined range of the environmental condition to detect a contaminate.

Reconfigure Communication Device

In an aspect of the disclosure, the data fusion center 125 may reconfigure the way in which a communication device 106 interprets sensor data for detecting a chemical, biological substance and/or radiation. For example, the data fusion center 125 may send updated software to a communication device 106 for detecting a particular contaminate from sensor data from one or more sensors 320 of the communication device 106.

Upon receiving the updated software, the communication device 206 may store the updated software in the machine-readable medium 106 and execute the updated software to detect the particular contaminate from sensor data. The data fusion center 125 may also send an updated sensor threshold for a sensor 320 to a communication device 106, as discussed above.

Adjust Reporting Interval and Reporting Mode

In an aspect of the disclosure, a communication device 106 may report detection of a contaminate based on a reporting interval stored as a parameter in the machine-readable medium 206. In one aspect, the reporting interval may specify a time interval between adjacent reporting times for the communication devices 106. A reporting time may refer to a time that is allocated for sending a report. During a time interval between reporting times, the communication device 106 may take sensor readings to determine whether a contaminate is present. If a contaminate is detected, then the communication device 106 may store the detection in the machine-readable medium 206 of the communication device 106 and report the detection to the data fusion center 125 during the next reporting time.

In one aspect, the data fusion center 125 may send a message to a communication device 106 specifying the reporting interval. Upon receiving the message, a communication device 106 may store the received reporting interval in the machine-readable medium 206 and report detections to the data fusion center 125 at reporting times spaced apart by the stored reporting interval. For example, the data fusion center 125 may decrease the reporting interval (increase the frequency of reports) when a threat is reported in the vicinity of the communication device 106.

In one aspect, the message from the data fusion center 125 may also include a start time of a first reporting time, in which subsequent reporting times are spaced apart by the reporting interval specified in the message. This allows the data fusion center 125 to control the times at which a communication device 106 sends a report. In one aspect, the data fusion center 125 may send different start times to different communication devices 106 in order to stagger the times at which the communication devices 106 send reports to the data fusion center 125. The data fusion center 125 may stagger the reporting times of different communication devices 106 to reduce network congestion by preventing the different communication devices 106 from sending reports at the same time.

In one aspect, a communication device 106 may send a report to the data fusion center 125 using one of a plurality of reporting modes. For example, in one of the reporting modes, the communication device 106 may send a report reporting detection of a contaminate without sensor data on which the detection is based. In this example, the report may identify the detected contaminate. The report may also include a location at which the contaminate is detected (e.g., based on a location provided by a positioning device 315) and a time stamp indicating an approximate time of detection. In another one of the reporting modes, the communication device 106 may send a report that includes some or all of the sensor data on which a detection of the contaminate is based. The data fusion center 125 may use the sensor data in the report to perform an independent analysis of the sensor data. For example, the data fusion center 125 may perform an independent analysis of the sensor data to verify a detection by the communication device 106. In one aspect, the plurality of reporting modes may include two or more reporting modes in which the communication device sends different amounts of sensor data to the data fusion center 125.

In one aspect, the data fusion center 125 may send a request to a communication device 106 for a report, in which the request specifies one of the plurality of reporting modes. Upon receiving the request, the communication device 106 may send a report based on the reporting mode specified in the request. For example, if the request specifies a reporting mode in which a report includes sensor data, then the communication device 106 sends a report including the sensor data to the data fusion center 125. In one aspect, when the data fusion center 125 receives a report reporting detection of a contaminate, the data fusion center 125 may send a request for a report to the communication device 106 specifying a reporting mode that includes sensor data. The reporting mode received by the communication device 106 may be stored as a parameter in the machine-readable medium 206 of the communication device 106.

Load Reporting from a Network

In an aspect of the disclosure, a network processing system 710 may estimate a load on a network and report the estimated network load to the data fusion center 125. For example, the network processing system 710 for a cellular network 115 may estimate a number of communication devices 106 using the network 115 and the capacity of the network 115. The capacity of the network may be a number of communication devices 106 that the network 115 can handle (e.g., at a minimum quality of service). In this example, the network processing system 710 may report the network load to the data fusion center 1125 indicating the number of communication devices using the network 115 and the capacity of the network 115. The network processing system 710 may use other factors to measure load including, but not limited to, carrier-to-interference (C/I) ratios of communication devices 106 using a network, dropped call rate and/or other factors. Other factors affecting the network load may include access channel load, paging channel load, number of calls that are active, data throughput on the radio network (e.g., base stations), queuing delays in the data network, queue depths in the radio network, and other factors. Thus, the network processing system 710 may consider any one or a combination of different factors to measure the network load.

The network processing system 710 may also report a load for individual base stations 110 of the cellular network 115. In this example, the network processing system 710 may estimate a load for a base station 100 based on a number of communication devices 106 using the base station 110 and the capacity of the base station 110.

FIG. 7 shows a conceptual block diagram of a network processing system 710 that may be used to measure network load and report the network load to the data fusion center 125. The network processing system 710 is positioned along one or more data paths between the communication devices 106 and the data fusion center 125. The network processing system 710 may be implemented using the processing system 200 illustrated in FIG. 2 or other architecture. Although the network processor system 710 is shown between the cellular network 115 and the communication network 120 in the example in FIG. 7, the network processing system 710 may be positioned anywhere in the communication system 100 between the communication devices 106 and the data fusion center 125, for example, depending on a network load being measured.

In one aspect, the data fusion center 125 receives a network load report from the network processing system 710 and decides to stop all or a percentage of communication devices 106 within a geographical area from sending reports based on the received network load. For example, the network processing system 710 may report a load of a base station 110 of the cellular network 115. In this example, if the reported load of the base station 110 is high (e.g., above a threshold), then the data fusion center 125 may decide to stop a percentage of communication devices 106 within the coverage area of the base station 110 from sending reports. The data fusion center 125 do may this using any of the techniques discussed above or other technique. In another example, if the reported load of the base station 110 is high (e.g., above a threshold), then the data fusion center 125 may restrict communication devices 106 within the coverage area of the base station 110 from using certain classes of services (e.g., low priority services). The data fusion center 125 may do this using any of the techniques discussed above or other technique.

Control Based on Administrative or Analytical Criteria

In an aspect of the disclosure, the data fusion center 125 may control the communication devices 106 based on an administrative or analytical criteria. For example, if an agency (e.g., Department of Homeland Security) determines a high threat level in a geographical area (e.g., city), then the data fusion center 125 may send a message to communication devices 106 within the geographical area to lower their sensor thresholds for a contaminate of interest. This may be done to increase the sensitivity of communication devices 106 within the geographical area subject to the high threat level. The data fusion center 125 may also send a message to the communication devices to frequently test for a contaminate of interest and to immediately report a detection to the data fusion center 125. The threat level may be communicated to the data fusion center 125, for example, using a user interface 212.

The data fusion center 125 may control the communication devices 106 based on other administrative or analytical criterions. For example, analytical criterions may include weather conditions (e.g., humidity, atmospheric pressure, etc.) in a geographical area that affect the sensitivity of sensors 320 within the geographical area. In this example, the data fusion center 125 may receive a report of a weather condition (e.g., humidity) in a geographical area, determine sensor thresholds for sensors 320 that are sensitive to the weather condition based on the reported weather condition, and send a message to communication devices 106 within the geographical area to adjust their sensor thresholds according to the determined sensor thresholds. The sensor thresholds for sensors 320 within a geographical area may also be adjusted for other atmospheric changes in the geographical area due to events, such as a volcanic eruption, fire, etc.

For an example of an administrative criteria, an agency may desire to test a network of sensors 320 within a geographical area to ensure that the sensors 320 are functional. In this example, the agency may instruct the data fusion center 125 to send a message to communication devices 106 within the geographical area to take sensor readings and send sensor reports to the data fusion center 125 at a high rate. The incoming sensor reports allow the data fusion center 125 to determine the functionality of sensors 320 within the geographical area. For example, if the sensor reports include geographical locations of the respective sensors 320, then the data fusion center 125 may determine the number and geographical distribution of functional sensors 320 within the geographical area. The data fusion center 125 may then send test results (e.g., number and geographical distribution of functional sensors 320) to the agency. The agency may also instruct the data fusion center 125 to adjust the sensor thresholds and/or reporting intervals of communication devices 106 within a geographical area.

The data fusion center 125 may allow an agency computer to remotely access the data fusion center 125 (e.g., via the communication network 120) to send instructions to the data fusion center 125 and to receive information (e.g., test results, reports of contaminate detections, etc.) from the data fusion center 125. Agency personal may also access the data fusion center 125 via the user interface 212 to input instructions to and receive information from the data fusion center 125. Thus, the data fusion center 125 may provide remote access, adjustment and updates to parameters related to reporting intervals, sensor engagement, analytical tools and other parameters.

Figure 10:
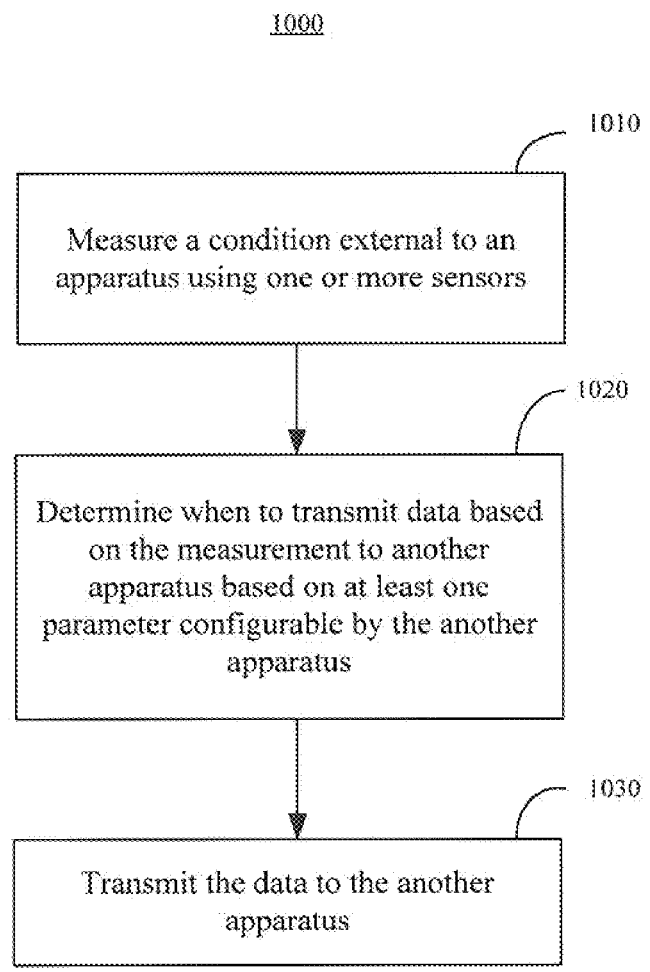
FIG. 10 is a flowchart of a process for communication.

FIG. 10 is a flow chart illustrating an example of the process for communication 1000. The process 1000 may be implemented by software modules stored in a machine-readable medium 206 and executed by a processor 204.

In step 1010, the process 1000 may measure a condition external to an apparatus using one or more sensors. The apparatus may be a communication device 106. In step 1020, the process 1000 may determine when to transmit data based on the measurement to another apparatus based on at least one parameter configurable by the another apparatus. The another apparatus may be the data fusion center 125 and the at least one parameter may include a reporting interval, a geographical area, or other parameter including any of the exemplary parameters discussed above. In step 1030, the process 1000 may transmit the data to the another apparatus.

Figure 11:
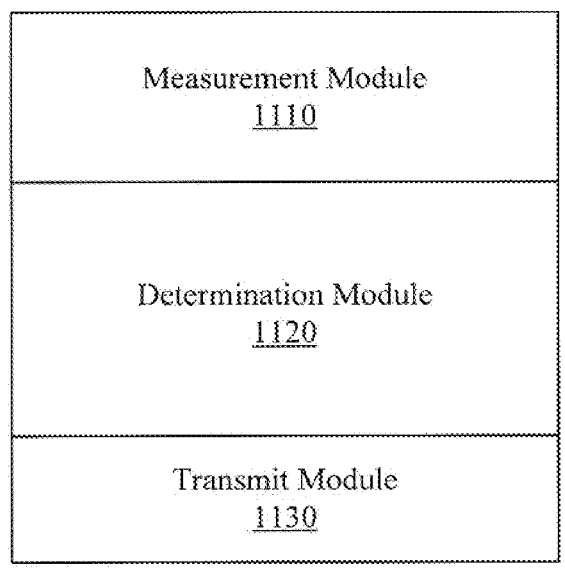
FIG. 11 is a block diagram illustrating an example of the functionality of an apparatus for communication.

FIG. 11 is a block diagram illustrating an example of the functionality of an apparatus for communication 1100 according to an aspect of the disclosure. The apparatus may be a communication device 106. The apparatus 1100 includes a processing system 200 having a measurement module 1110 for measuring a condition external to an apparatus using one or more sensors, a determination module 1120 for determining when to transmit data based on the measurement to another apparatus based on at least one parameter configurable by the another apparatus, and a transmit module 1130 for transmitting the data to the another apparatus.

Figure 12:
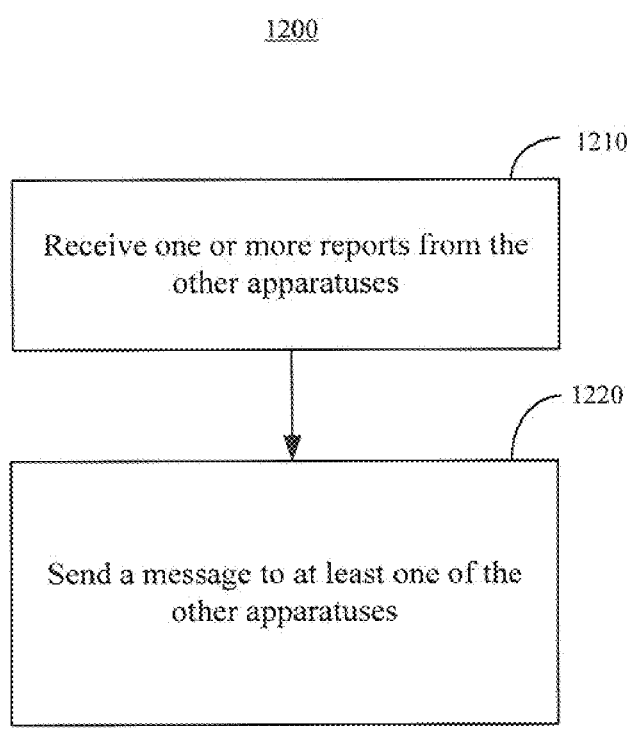
FIG. 12 is a flowchart of a process for managing other apparatuses.

FIG. 12 is a flow chart illustrating an example of the process performed at an apparatus for managing other apparatuses 1200. The process 1200 may be implemented by software modules stored in a machine-readable medium 206 and executed by a processor 204.

In step 1210, the process 1200 receives one or more reports from the other apparatuses, wherein each report comprises data based on at least a sensor measurement at a respected one of the other apparatus. The other apparatuses may be communication devices 106. In step 1220, the process 1200 sends a message to at least one of the other apparatuses, wherein the message instructs the at least one of the other apparatuses to configure at least one parameter that controls when the at least one of the other apparatuses sends a report to the apparatus.

Figure 13:
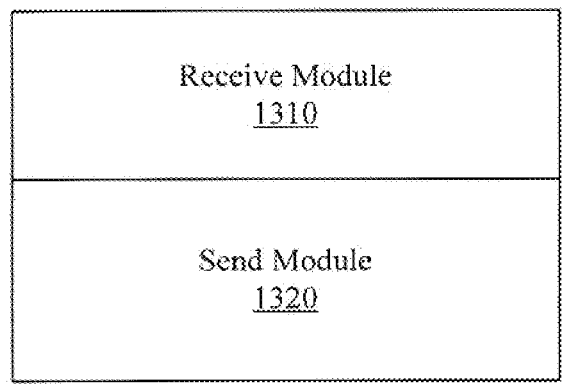
FIG. 13 is a block diagram illustrating an example of the functionality of an apparatus for managing other apparatuses.

FIG. 13 is a block diagram illustrating an example of the functionality of an apparatus for communication 1300 according to an aspect of the disclosure. The apparatus may be a communication device 106. The apparatus 1300 includes a processing system 200 having a receive module 1310 for receiving one or more reports from the other apparatuses, wherein each report comprises data based on at least a sensor measurement at a respected one of the other apparatus, and a send module 1320 for sending a message to at least one of the other apparatuses, wherein the message instructs the at least one of the other apparatuses to configure at least one parameter that controls when the at least one of the other apparatuses sends a report to the apparatus.

Figure 14:
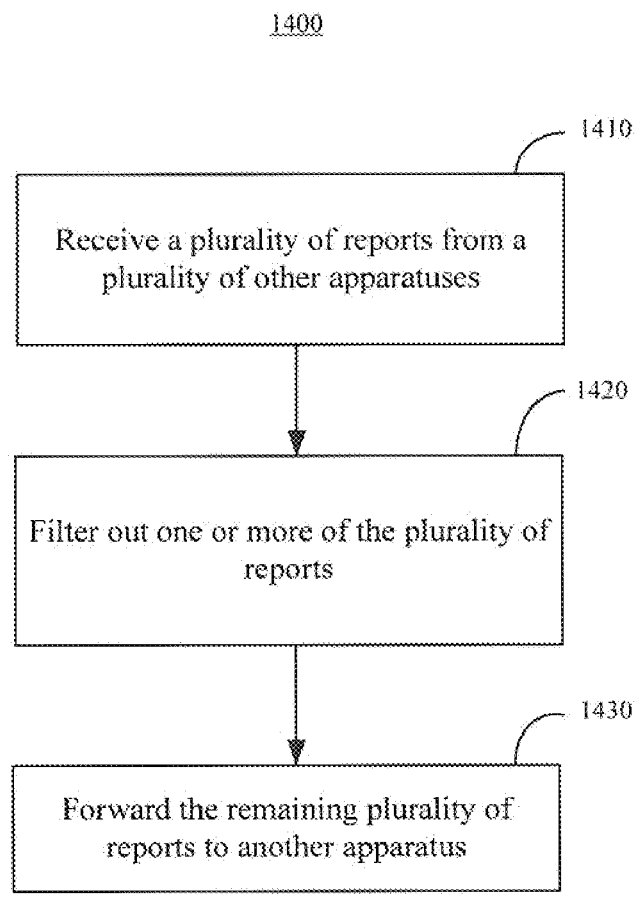
FIG. 14 is a flowchart of a process for managing reports.

FIG. 14 is a flow chart illustrating an example of the process performed at an apparatus for managing reports 1400. The process 1400 may be implemented by software modules stored in a machine-readable medium 206 and executed by a processor 204.

In step 1410, the process 1400 receives a plurality of reports from a plurality of other apparatuses. The other apparatuses may be communication devices 106. In step 1420, the process 1400 filters out one or more of the plurality of reports. In step 1430, the process 1400 forwards the remaining plurality of reports to another apparatus, wherein each of the plurality of reports comprises data based on a sensor measurement at the respective one of the plurality of other apparatuses. The another apparatus may be the data fusion center 125.

Figure 15:
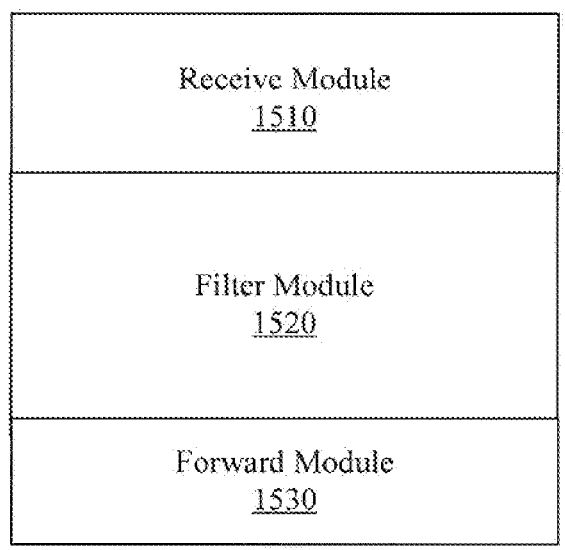
FIG. 15 is a block diagram illustrating an example of the functionality of an apparatus for managing reports.

FIG. 15 is a block diagram illustrating an example of the functionality of an apparatus for managing reports 1500 according to an aspect of the disclosure. The apparatus 1500 includes a processing system 200 having a receive module 1510 for receiving a plurality of reports from a plurality of other apparatuses, a filter module 1520 for filtering out one or more of the plurality of reports, and a forward module 1530 for forwarding the remaining plurality of reports to another apparatus, wherein each of the plurality of reports comprises data based on a sensor measurement at the respective one of the plurality of other apparatuses.

The teachings herein may be incorporated into (e.g., implemented within or performed by) a variety of wired or wireless apparatuses. In some aspects, a communication device 106 may comprise an access terminal and each of a base station 110, a wireless access node 140 and a network processing system 710 may comprise an access point.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

Those of skill in the art would appreciate that the various illustrative blocks, units, elements, components, methods, and algorithms described herein may be implemented as electronic hardware, computer software, or combinations of both. To illustrate this interchangeability of hardware and software, various illustrative blocks, units, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communication, comprising:
a circuit configured to determine when to transmit data to another apparatus, wherein the determination is based on at least one parameter configurable by the another apparatus and comprising a type of sensor, the circuit is further configured to compare the type of sensor with a type of sensor of one or more sensors at the apparatus and the determination when to transmit the data is based at least on the comparison; and
a transmitter configured to transmit the data.

2. The apparatus of claim 1, wherein the circuit is configured not to transmit the data if the type of sensor matches the type of sensor of the one or more sensors.

3. The apparatus of claim 1, wherein the at least one parameter comprises a reporting interval.

4. The apparatus of claim 1, wherein the at least one parameter comprises a reporting mode, the reporting mode specifying an amount of data to be included in the data.

5. The apparatus of claim 1, wherein the at least one parameter comprises a sensor threshold, the circuit is configured to compare the measurement to the sensor threshold, and the determination when to transmit the data is based at least on the comparison of the measurement to the threshold.

6. The apparatus of claim 5, wherein the circuit is configured to transmit the data if the measurement is equal to or above the sensor threshold.

7. The apparatus of claim 1, further comprising a second sensor, wherein the circuit is configured to adjust the at least one parameter based at least on a measurement from the second sensor.

8. The apparatus of claim 7, wherein the at least one parameter comprises a sensor threshold.

9. The apparatus of claim 8, wherein the second sensor comprises a humidity sensor or a temperature sensor.

10. The apparatus of claim 1, further comprising a positioning device configured to determine a location of the apparatus, and wherein the determination when to transmit the data is based at least in part on the location of the apparatus.

11. The apparatus of claim 1, wherein the circuit is configured to measure a load of a communication network and the determination when to transmit the data is based at least on the measurement of the load.

12. An apparatus for communication, comprising:
one or more sensors configured to measure a condition external to the apparatus;
a circuit configured to determine when to transmit data to another apparatus, wherein the determination is based on at least one parameter configurable by the another apparatus and comprising a type of sensor and a priority number, the circuit is further configured to compare the priority number with a number allocated to the apparatus, and the determination when to transmit the data is based at least on the comparison of the priority number with the number allocated to the apparatus.

13. The apparatus of claim 12, wherein the circuit is configured not to transmit the data if the priority number does not match the number allocated to the apparatus.

14. The apparatus of claim 12, wherein the apparatus supports different classes of services and the circuit is configured to stop one or more of the different classes of services based at least on the comparison of the priority number with the number allocated to the apparatus.

15. An apparatus for communication, comprising:
one or more sensors configured to measure a condition external to the apparatus;

a positioning device configured to determine a location of the apparatus;

a circuit configured to determine when to transmit data based on the measurement to another apparatus, wherein the determination is based on at least one parameter configurable by the another apparatus and comprising a geographical area, and the determination is based at least on whether the location of the apparatus is within the geographical area; and a transmitter configured to transmit the data.

16. An apparatus for communication, comprising:

one or more sensors configured to measure a condition external to the apparatus;

a circuit configured to determine when to transmit data based on the measurement to another apparatus, wherein the determination is based on at least one parameter configurable by the another apparatus, the circuit is further configured to measure a load based on network latency or paging channel of a communication network, and the determination is based at least on the measurement of the load; and a transmitter configured to transmit the data.

17. An apparatus for communication, comprising:

one or more sensors configured to measure a condition external to the apparatus;

a circuit configured to determine when to transmit data based on the measurement to another apparatus, wherein the determination is based on at least one parameter configurable by the another apparatus and comprising a range from a base station, the circuit is further configured to determine a distance of the apparatus from the base station, and the determination is based at least on whether the distance of the apparatus from the base station is within the range from the base station; and a transmitter configured to transmit the data.

18. An apparatus for communication, comprising:

one or more sensors configured to measure a condition external to the apparatus;

a circuit configured to determine when to transmit data based on the measurement to another apparatus, wherein the determination is based on at least one parameter configurable by the another apparatus and comprising a cell ID, and the determination is based at least on whether the apparatus is being served by a cell corresponding to the cell ID; and a transmitter configured to transmit the data.

19. An apparatus for communication, comprising:

one or more sensors configured to measure a condition external to the apparatus;

a circuit configured to determine when to transmit data based on the measurement to another apparatus, wherein the determination is based on at least one parameter configurable by the another apparatus, and the circuit is configured to configured the at least one parameter based at least on a geographical area in which the apparatus is located; and a transmitter configured to transmit the data.

20. A method for communication, comprising:

determining, at an apparatus, when to transmit data to another apparatus based on at least one parameter configurable by the another apparatus and comprising a type of sensor;

comparing the type of sensor with a type of sensor of one or more sensors at the apparatus wherein the determination when to transmit the data based at least on the comparison; and transmitting the data to the another apparatus.

21. The method of claim 20, wherein determining when to transmit the data based at least on the comparison comprises determining not to transmit the data if the type of sensor matches the type of sensor of the one or more sensors.

22. The method of claim 20, wherein the at least one parameter comprises a reporting interval.

23. The method of claim 20, wherein the at least one parameter comprises a reporting mode, the reporting mode specifying an amount of data to be included in the data.

24. The method of claim 20, wherein the at least one parameter comprises a sensor threshold, the method further comprises comparing the measurement to the sensor threshold, and determining when to transmit the data is based at least on the comparison of the measurement to the sensor threshold.

25. The method of claim 24, wherein determining when to transmit the data comprises determining to transmit the data if the measurement is equal to or above the sensor threshold.

26. The method of claim 20, further comprising adjusting the at least one parameter based at least on a measurement from a second sensor.

27. The method of claim 26, wherein the at least one parameter comprises a sensor threshold.

28. The method of claim 27, wherein the second sensor comprises a humidity sensor or temperature sensor.

29. The method of claim 20, further comprising determining a location of the apparatus, wherein determining when to transmit the data is based at least in part on the location of the apparatus.

30. The method of claim 20, further comprising measuring a load of a communication network, wherein determining when to transmit the data is based at least on the measurement of the toad.

31. A method for communication, comprising:

measuring a condition external to an apparatus using one or more sensors;

determining when to transmit data to another apparatus based on at least one parameter configurable by the another apparatus and comprising a type of sensor and a priority number; and comparing the priority number with a number allocated to the apparatus, wherein determining when to transmit the data is based at least on the comparison of the priority number with the number allocated to the apparatus.

32. The method of claim 31, wherein the determining when to transmit the data comprises determining not to transmit the data if the priority number does not match the number allocated to the apparatus.

33. The method of claim 31, further comprising stopping one or more classes of services based at least on the comparison of the priority number with the number allocated to the apparatus.

34. A method for communication, comprising:

measuring a condition external to an apparatus using one or more sensors;

determining when to transmit data based on the measurement to another apparatus based on at least one parameter configurable by the another apparatus and comprising a geographical area;

determining a location of the apparatus;

determining whether the location of the apparatus is within the geographical area, wherein determining when to transmit the data, is based at least on whether the location of the apparatus is within the geographical area; and transmitting the data to the another apparatus.

35. A method for communication, comprising:
- measuring a condition external to an apparatus using one or more sensors;
- determining when to transmit data based on the measurement to another apparatus based on at least one parameter configurable by the another apparatus;
- measuring a load of the communication network based on network latency or paging channel of a communication network, wherein determining when to transmit the data is based at least on the measurement of the load; and
- transmitting the data to the another apparatus.

36. A method for communication, comprising:
- measuring a condition external to an apparatus using one or more sensors;
- determining when to transmit data based on the measurement to another apparatus based on at least one parameter configurable by the another apparatus and comprising a range from a base station;
- determining a distance of the apparatus from the base station, wherein determining when to transmit the data is based at least on whether the distance of the apparatus from the base station is within the range from the base station; and
- transmitting the data to the another apparatus.

37. A method for communication, comprising:
- measuring a condition external to an apparatus using one or more sensors;
- determining when to transmit data based on the measurement to another apparatus based on at least one parameter configurable by the another apparatus and comprising a cell ID, wherein determining when to transmit the data is based at least on whether the apparatus is being served by a cell corresponding to the cell ID; and
- transmitting the data to the another apparatus.

38. A method for communication, comprising:
- measuring a condition external to an apparatus using one or more sensors;
- determining when to transmit data based on the measurement to another apparatus based on at least one parameter configurable by the another apparatus;
- configuring the at least one parameter based at least on a geographical area in which the apparatus is located; and
- transmitting the data to the another apparatus.

39. A non-transitory machine-readable medium for storing instructions, wherein the instructions, upon execution by an apparatus, cause the apparatus to:
- determine when to transmit data to another apparatus based on at least one parameter configurable by the another apparatus and comprising a type of sensor;
- compare the type of sensor with a type of sensor of one or more sensors at the apparatus, wherein the determination when to transmit the data is based at least on the comparison; and
- transmit the data to the another apparatus.

40. An access terminal, comprising:
- a circuit configured to determine when to transmit data to another apparatus, wherein the determination is based on at least one parameter configurable by the another apparatus and comprising a type of sensor, the circuit is further configured to compare the type of sensor with a type of sensor of one or more sensors at the access terminal, and the determination when to transmit the data is based at least on the comparison;
- an antenna; and
- a transmitter configured to transmit the data via the antenna.

* * * * *